(12) United States Patent
Ameen et al.

(10) Patent No.: US 7,126,340 B1
(45) Date of Patent: Oct. 24, 2006

(54) METHOD TO CHARACTERIZE MICROFRACTURED HYDROCARBON RESERVOIRS BY ARTIFICIALLY INDUCED ANISOTROPY OF MAGNETIC SUSCEPTIBILITY

(75) Inventors: Mohammed S. Ameen, Dhahran (SA); Ernest A. Haliwood, The Green Sedbergh (GB)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 11/240,851

(22) Filed: Sep. 30, 2005

(51) Int. Cl.
*G01V 3/08* (2006.01)

(52) U.S. Cl. ..................................... 324/377
(58) Field of Classification Search ................ 324/377
See application file for complete search history.

(56) References Cited

U.S. PATENT DOCUMENTS

| | | | | |
|---|---|---|---|---|
| 5,012,674 A | * | 5/1991 | Millheim et al. | 73/152.03 |
| 5,323,855 A | * | 6/1994 | Evans | 166/248 |

\* cited by examiner

*Primary Examiner*—Bot LeDynh
(74) *Attorney, Agent, or Firm*—Bracewell & Giuliani,LLP

(57) ABSTRACT

Subterranean hydrocarbon reservoirs are analyzed by characterizing the relative presence and character of microfractures in rock samples from the reservoirs. Core samples are saturated with a suspension of magnetite particles of known concentration. The samples are then subjected to an applied magnetic field of known strength. The anisotropy of magnetic susceptibility, or AMS, of the samples is then observed, providing a measure of grain orientation in the samples. The characteristics of the microfractures in the samples are thus available to characterize the reservoirs, and in particular the contribution of the microfractures to the porosity and permeability of formations in the reservoirs.

18 Claims, 25 Drawing Sheets

Planar Fabric

AMS Ellipsoid

**Well 1 Depositional Fabrics
Zones A and B Combined**

*Zone A*

*Zone B*

**Well 1 Microfracture Fabrics
Zones A and B Combined**

Zone A

Zone B

Well 1, Zone A

N=5
Largest Cell Size =2

Well 1, Zone B

N=32
Largest Cell Size =7

Well 2 All Samples (Including Additional Ones)

Depositional-Style

Microfracture-Style

Well 2

$N=3$
Largest Cell Size $=2$

*SAA 3.2 & 4.1 Sub Samples BGF*

N=16
Mean Dec=86.8°

N=16
Mean Dec=315.1°
Inc=-81.2°
Alpha95=5.6°

SAA 4.3 Sub Samples BGF $K_{max}$ $N=8$
Mean Dec=164.1°
Alpha95 is too big $K_{min}$ $N=8$
Mean Dec=315.6°
Inc=70.7°
Alpha95=15.6°

Well 1

$N=12$
Mean Dec=38.1°

Pressure Solution Shortening (X = 0.0033)
ft/100 ft

METHOD TO CHARACTERIZE MICROFRACTURED HYDROCARBON RESERVOIRS BY ARTIFICIALLY INDUCED ANISOTROPY OF MAGNETIC SUSCEPTIBILITY

BACKGROUND OF THE INVENTION

1. Field of the Invention

The present invention herein relates to evaluation of performance and petrophysics of subterranean naturally-fractured hydrocarbon reservoirs.

2. Description of the Related Art

In evaluating subsurface reservoirs of interest for the presence and production of hydrocarbons, two types reservoirs are commonly encountered. The first and more often encountered type of subsurface hydrocarbon reservoir is what has become known as a conventional or non-fractured reservoir. The formation rock has an inherent porosity and permeability because of its lithological and textural composition, with connected "conventional reservoir" pores, and hydrocarbon fluids can therefore accumulate in the rock. The other type of reservoir is what is known as a microfractured reservoir, in which porosity and/or permeability is not inherent from the time of rock deposition. The two types of reservoirs are different types of reservoirs with different pore space types, requiring different techniques for characterization.

Microfractured reservoirs are dependent on the presence of fractures in the formation rocks for their porosity and permeability. Pore space in microfractured reservoir formation rock is in effect controlled by, and formed as a result of, the presence of connected microfractures. Microfractures are different from connected, conventional reservoir pores in terms of their nature, origin and their impact on reservoir performance. Microfractures are cracks that occur in the rocks due to deformation under natural earth stresses. They are distinctive in having planar or semi-planar shapes, and with clearly defined orientation.

In evaluating actual or projected performance of certain hydrocarbon reservoirs, particularly in rock formations of low porosity and permeability known as tight gas reservoirs, the presence of microfractures in formation rock has played an important role. Microfractures in rock formations are typically very small, on the order of ten microns to a millimeter scale. Accordingly, microfractures cannot, so far as is known, be readily characterized by visual methods using core samples. Further, microfractures are below the resolution levels of borehole images.

It has been conventional to characterize the presence of microfractures in core samples using either optical or electron microscopy techniques on thin sections taken from the core samples. Results obtained from these methods gave only rough assessments, and that often inaccurate ones, of the fracture-related physical characteristics of the formation rocks of interest. These techniques were also very time consuming and expensive. Further, they did not permit precise or direct assessment of the microfractures' contribution to rock petrophysics.

SUMMARY OF THE INVENTION

Briefly, the present invention provides analyzing a subsurface, naturally fractured, hydrocarbon reservoir of interest to characterize the reservoir. Rock specimens are obtained from a core sample from the hydrocarbon reservoir. The remanent magnetization of the rock specimens is then determined and the natural magnetic susceptibility of a first of the rock specimens is determined. A second of the rock specimens is then saturated with a magnetic fluid to enhance its magnetic susceptibility, and the enhanced magnetic susceptibility of the second rock specimen is determined. From the natural magnetic susceptibility of the first specimen and the enhanced magnetic susceptibility of the second specimen, one or more characterizations of the subsurface hydrocarbon reservoir are then determined.

The characterization of the subsurface hydrocarbon reservoirs obtained with the present invention, based on microfractures, include: fracture detection, fracture orientation, fracture porosity and permeability anisotropy. These characterizations directly relate to petrophysics of a formation in the reservoir and are then available for reservoir management purposes.

BRIEF DESCRIPTION OF THE DRAWINGS

A better understanding of the present invention can be obtained when the detailed description set forth below is reviewed in conjunction with the accompanying drawings, in which.

Figure 1A:
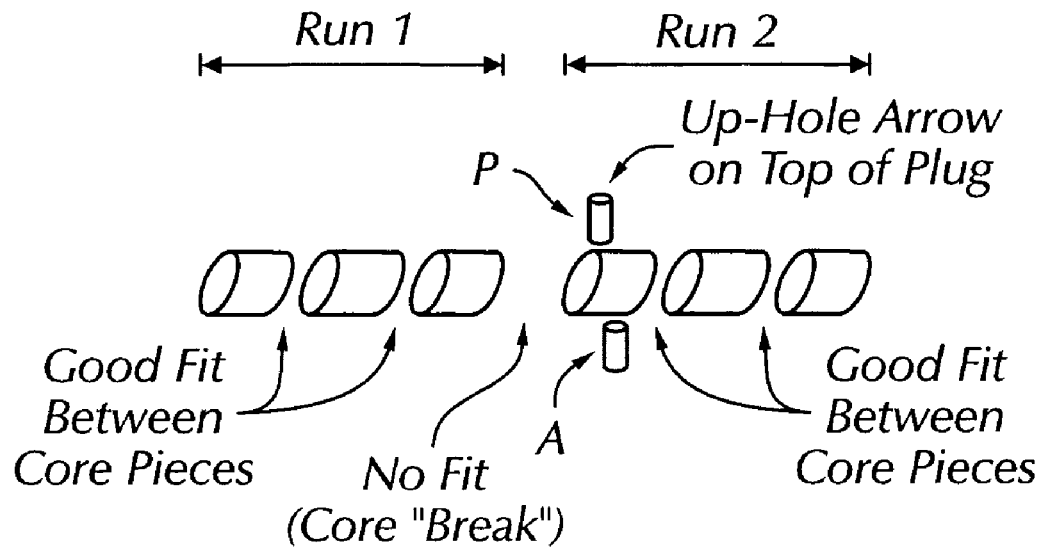
FIG. 1a is a schematic diagrams of the orientation of rock plugs and obtained from whole-core of a subsurface hydrocarbon reservoir studied for the present invention.

To better understand the invention, we shall carry out the detailed description of some of the modalities of the same, shown in the drawings with illustrative but not limited purposes, attached to the description herein.

DETAILED DESCRIPTION OF THE PREFERRED EMBODIMENTS

I. Introduction

The present invention is based on using the artificially enhanced magnetic susceptibility anisotropy or AMS of rock samples from subsurface formations for the characterization of microfractures, and associated porosity and permeability anisotropy in subsurface hydrocarbon reservoirs of interest.

The present invention provides a non-destructive, quick, precise and reliable method for the detection and characterization of open, connected microfractures in hydrocarbon reservoirs. Existing methods are based on optical and scanning-electron microscopy, which is a laborious, costly method with a considerably higher margin of error than the AMS-based method of the present invention. Results obtained with the present invention permit analysis to characterize microfractures in terms of detection, orientation, porosity, and permeability anisotropy for reservoir management purposes.

Three separate characteristics of the enhanced AMS as described herein are applicable for distinguishing samples carrying depositional-style pore-fabrics from those with microfracture-type pore-fabrics. These are the bulk magnetic susceptibility, K; the strength of the magnetic foliation parameter, F; and the directional properties of the magnetic susceptibility fabrics.

According to the present invention, Applicants have found that it is possible to detect, and determine the relative presence of microfractures in such reservoirs and further to characterize microfractured hydrocarbon reservoirs in terms of fracture detection, orientation, porosity, and permeability anisotropy.

II. Process

The process of the invention is performed using rock specimens (plug samples) obtained from a core sample obtained from a subsurface hydrocarbon reservoir of interest. The core sample is obtained via conventional well core sample techniques from a formation in the reservoir. From the core sample, plug samples are drilled using a non-magnetic plugging bit. A suitable such bit, for example, is a 25 mm diameter non-magnetic plugging bit. With the present invention, two separate sets of specimens are cut from each plug sample:

(a) The first is used for palaeomagnetic re-orientation of the core and natural AMS measurements; and (b) The second is used for enhanced AMS measurements.

The sampling procedure performed begins by fitting adjacent whole-core pieces together, so that they are restored into their correct relative orientations. Each of the resulting continuous intervals of core is referred to as a core run. Runs are separated by breaks, across which a reliable fit cannot be made (FIG. 1a). Palaeomagnetic measurements on suitable sets of plug samples from each run are then used to determine the geographic orientation of a reference direction within that interval of core.

Figure 1B:
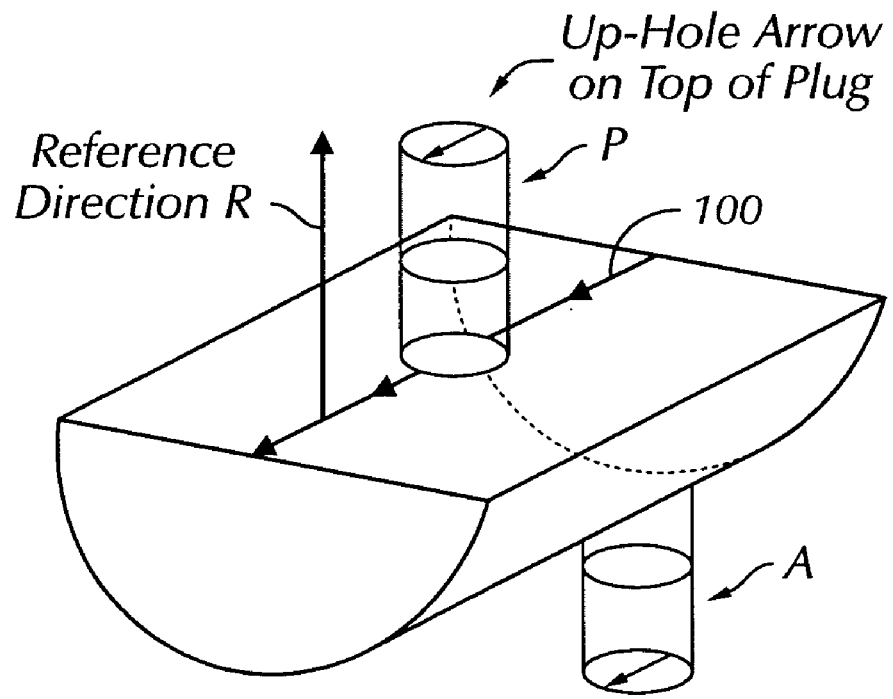
FIG. 1b is a schematic diagram of the orientation of rock plugs obtained from slabbed-core of a subsurface hydrocarbon reservoir for the present invention.

In a test on actual formation, two groups of cores were used. In the first group cores had all been slabbed prior to drilling the plug samples. In these cores, the reference fiducial direction ("R") was defined as pointing outward perpendicular to the flat surface of the "two-thirds" core-cut (FIG. 1b). In the second group, the core was still whole, and in this core, R points outwards through an orientation line 100 that had been previously marked on the surface of the core, as an arbitrary reference for relative orientation of the non-oriented core (FIG. 1a).

It is preferable, where possible, for three separate pairs of plug samples (i.e. six individual plugs) to be drilled from each core run. Axes of all plugs are to be perpendicular to the core axis and the two plugs in each pair are drilled from opposite sides of the core. This procedure facilitates identification and vector subtraction of any spurious components of magnetization associated with the plugging or related procedures. One plug in each pair (the "principal" or "P"-plug) is drilled into the reference direction, R, and the other (the "antiparallel", or "A"-plug) is drilled from the opposite side of the core. Sample numbers for the latter plugs were given the suffix A (for "antiparallel").

It is also preferred that several specimens be cut from each plug sample. Ones closest to the center of the core (i.e. furthest from any possible surface contamination of the core due to drilling) are used for palaeomagnetic analyses and natural AMS measurements. The others are cut into 15 mm cubes for use in enhanced AMS and pore fabric measurements.

Next, the cores are re-oriented into geographic co-ordinates by the palaeomagnetic method, in which the direction of North within each individual core run is defined from the mean direction of characteristic remanent magnetism (ChRM) in that run, in the typical manner. This enables the geographic azimuth of the arbitrary reference line R (false north) to be specified. Fractures, sedimentary structures, grain fabrics and other directional properties of the core that are measured relative to R can then be referred to real geographic North.

Most rocks carry either one or two geologically useful components of remanent magnetization. These are:

(a) The primary component, which is acquired at the time of formation of the rock and which provides a record of the direction of north at that time; and (b) A viscous remanent magnetization (referred to as VRM), which gradually builds up in the rock over long periods of time and which records the direction of mean magnetic north over the past few thousand years. This provides a direct determination of present-day geographic North, since short-term secular variation of the geomagnetic field is effectively averaged out over these time-scales.

Each plug sample is then subjected to incremental thermal demagnetization, to remove spurious components of magnetization and to isolate the geologically useful components. In samples that carry both a primary component and a VRM component, the primary component is commonly more stable than the VRM. Consequently, the VRM direction is defined by demagnetization at lower temperatures than those required to isolate the primary component.

The remanent magnetism of the samples are measured. In a test, the measurements were made using a suitable magnetometer, such as an AGICO JR5A automated high-sensitivity spinner magnetometer. Thermal demagnetization was carried out with a suitable demagnetizer, such as a Magnetic Measurements MMTD1 thermal demagnetizer. Both instruments were situated within the same magnetically shielded enclosure, to minimize exposure of samples to external magnetic fields during laboratory handling. The magnetic susceptibility was measured after each heating step above 150° C., to monitor any magneto-mineralogical trans caused by the heating process.

During thermal demagnetization, temperature increments in the range 25° to 40° C. are used, starting at 75° C. Demagnetization is continued until either the remanent magnetism becomes too weak for further reliable measurement or until magneto-mineralogical trans (alteration of existing magnetic minerals and/or generation of new minerals, particularly magnetite) began to occur as a result of the heating. This was detected from a significant increase in the magnetic intensity and/or susceptibility.

The thermal demagnetization data were processed by a 3-D Principal Component Analysis as described in "The Least Squares Line and Plane and the Analysis of Paleomagnetic Data", Kirschvink, Geophysical Journal of the Royal Astronomical Society, Vol. 62, pps 699–718. This processing was performed to define the directions of the significant components of magnetization in each sample.

If the rock is characterized by a dominant set of planar, open, and connected microfractures, the fluid fills the fracture network, producing a relatively strong magnetic foliation. This is parallel with the mean microfracture orientation and its direction can be determined from AMS measurements on samples saturated with magnetic-fluid (FIG. 2a).

Figure 2A:
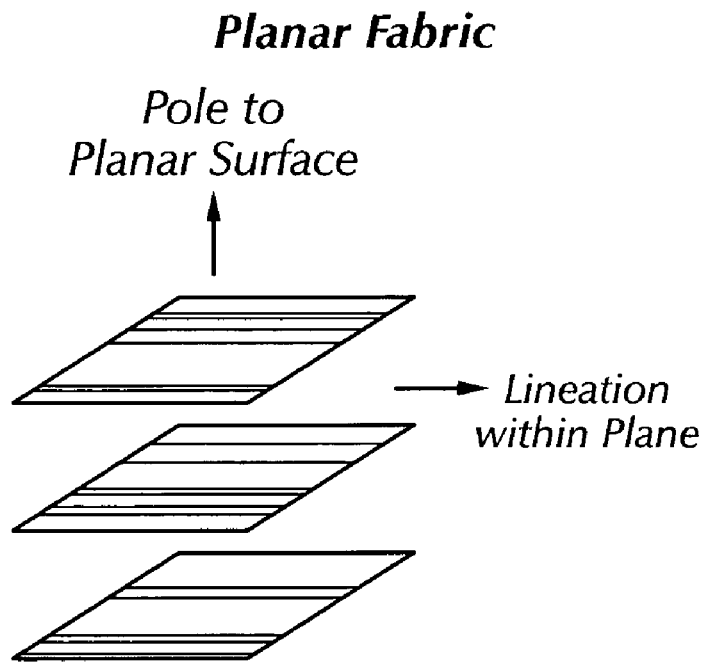
FIGS. 2a and 2b are schematic diagrams of representative magnetic susceptibility anisotropy measurements.

Furthermore, in samples where sufficient shear deformation has occurred along the fractures (e.g. microfaulting) to create linear slip-indictors (slickenlines) the AMS is usually characterized by a magnetic lineation defined by the maximum susceptibility ($K_{max}$ axis), that is parallel with the shear direction, i.e. slickenlines (FIG. 2a).

Figure 2B:
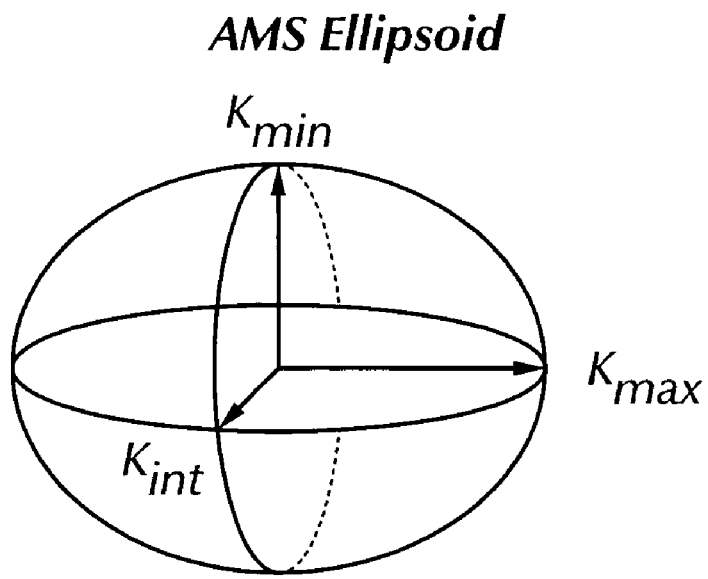

The shape of the magnetic susceptibility ellipsoid (FIG. 2b) is determined by the relative strength of the magnetic foliation, F and the magnetic lineation, L. These AMS magnitude parameters can be calculated from the measured AMS, using the relationships:

$$L = K_{max}/K_{int} \quad (1)$$

$$F = K_{int}/K_{min} \quad (2)$$

A further useful magnitude parameter is the anisotropy degree, P, where $$P = K_{max}/K_{min} \quad (3)$$

Microfracture-type fabrics can therefore be distinguished from depositional-style fabrics using three separate criteria:

1. The magnetic susceptibility (per unit volume) of samples with connected, open microfractures tends to be systematically greater than that of samples with depositional fabrics. This reflects the enhanced porosity due to the microfractures, which results in a higher volume of ferrofluid within these samples.

2. The magnetic foliation parameter, F, for samples with a dominant, open, microfracture set also tends to be systematically greater than that for samples with depositional-style fabrics (i.e. the magnetic susceptibility ellipsoid for the former tends to be more oblate than for the latter). This is due to the concentration of ferrofluid within the planar fractures, which enhances the foliar structure of the fabric.

3. The directional properties of the enhanced AMS fabrics reflect two components: a primary depositional fabric (after restoring bedding to syndepostional orientation) is generally characterized by relatively shallow $K_{max}$ axes and steep $K_{min}$ axes (within ~20 to 25° of the horizontal and vertical respectively). In contrast, microfracture-type fabric is aligned in a direction related to the mean fracture plane orientation. Thus, apart from the case of sub-horizontal fractures, $K_{min}$ axes of microfracture-type fabrics often have steeper inclinations than those of depositional-style fabrics.

However, when the fracture fabric has shallow dip angles, similar to those of samples with depositional fabrics, the dip directions (azimuths) of the microfracture fabrics are generally quite distinct from those of planar structures associated with the depositional fabrics. This is further validated by microscopic inspection of a selection of the tested samples and comparing the magnetically deduced fabrics with visible ones in the core.

The tests conducted on the reservoir cores also demonstrated that anisotropy of magnetic susceptibility (AMS) provides a rapid and precise measurement of the statistical three-dimensional orientation of the grains in the oriented rock samples.

Two separate types of AMS measurements are used:

A. Natural AMS, which reflects the preferred orientations of natural magnetic mineral grains that have relatively strong magnetic susceptibilities (such as ferromagnetic iron oxides and/or sulphides and also paramagnetic clay minerals). Essentially, the maximum susceptibility ($K_{max}$) axis of a sample corresponds with the preferred orientation of grain long dimensions and the minimum susceptibility ($K_{min}$) axis with that of grain short dimensions within the sample.

B. Artificially enhanced AMS, in which the natural AMS was enhanced by saturating the samples with a magnetic fluid. Then tests can be conducted on the samples. In addition the samples are dried under controlled conditions to facilitate the precipitation of a thin film of ultrafine (nanometer size) magnetite particles on to the surfaces of all accessible grains within the sample, including quartz, carbonate, feldspar grains etc, which are usually weakly diamagnetic or paramagnetic. These grains then behave as though they are ferromagnetic solids and the resulting AMS specifies the grain fabric of the whole rock, rather than just that of the natural ferromagnetic minerals. To distinguish this from the natural AMS the resulting fabric is referred to here as the bulk grain fabric (BGF) or enhanced AMS.

Experiments under controlled conditions, as is known, allow a distinction to be made between depositional-style magnetic fabrics, in which $K_{max}$ and $K_{min}$ axes lie reasonably close (usually within about 20 to 25°) to the horizontal and vertical, respectively, and secondary-style fabrics in which they depart significantly from these directions. This distinction applies both to the natural AMS and to the enhanced AMS. Depositional-style fabrics usually provide reliable information on sediment transport directions.

Figure 3A:
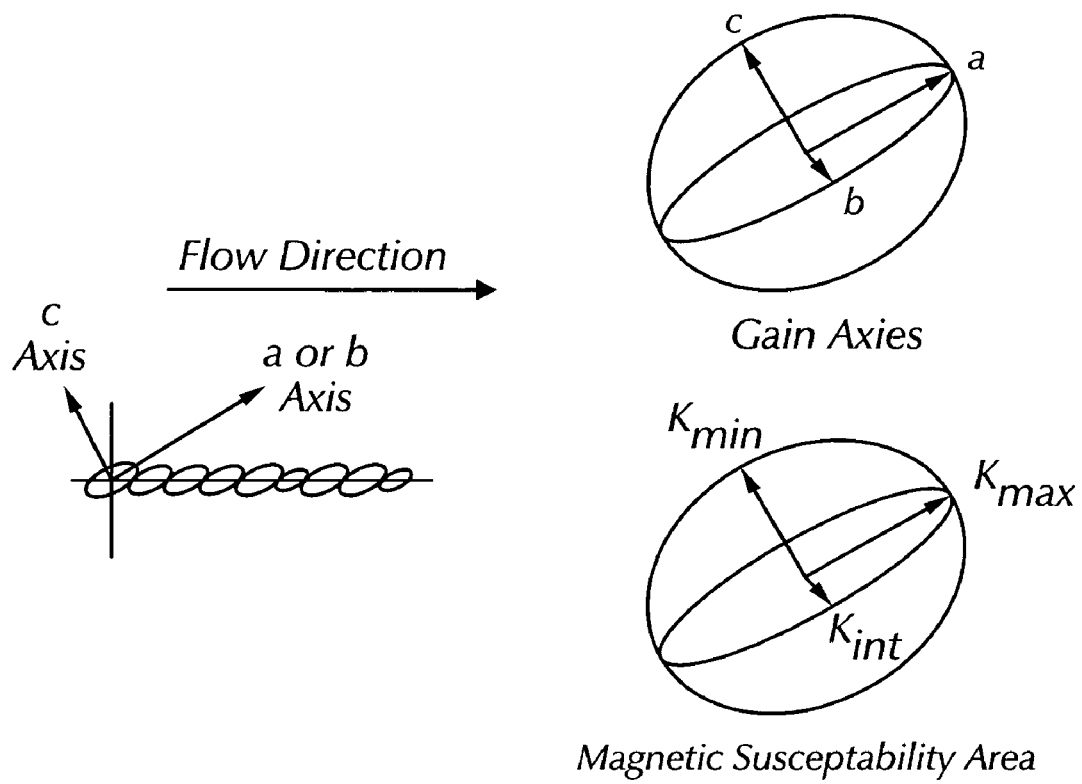
FIGS. 3a, 3b and 3c are schematic diagrams of examples of grain fabric, associated with fluid flow at the depositional environment in a clastic rock.
Figure 3B:
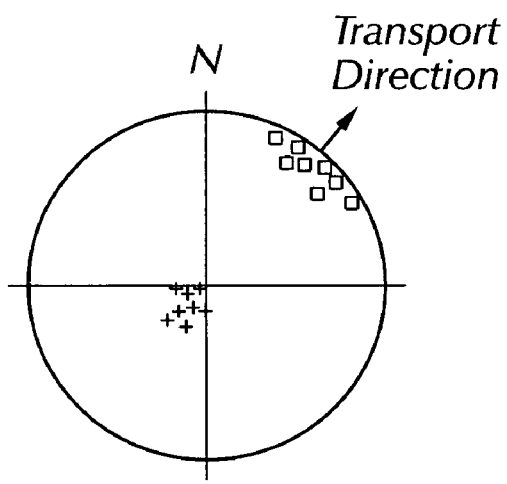
Figure 3C:
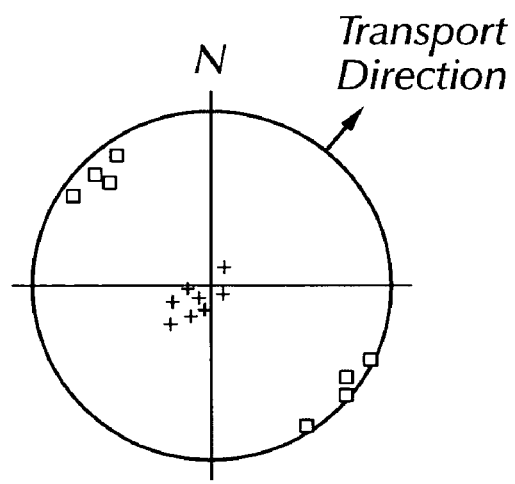
Figure 4A:
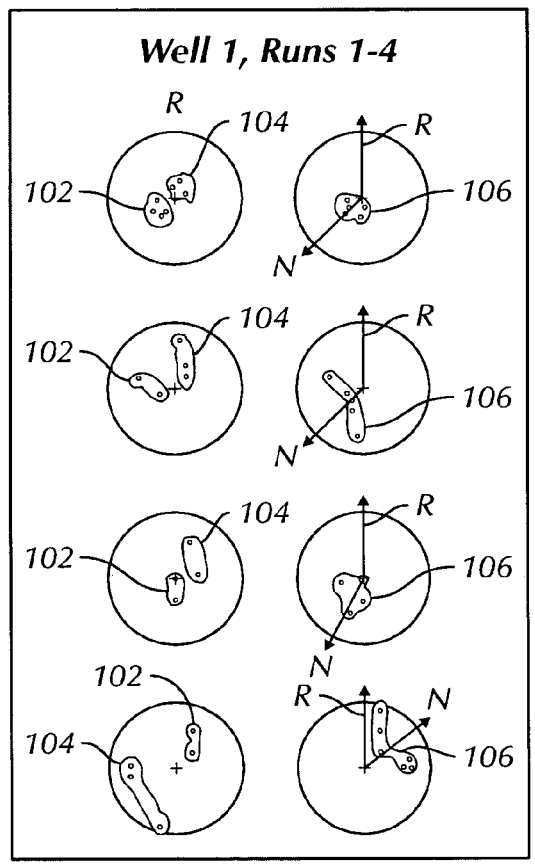
FIGS. 4a, 4b, 4c and 4d are stereographic projections of remanent magnetization components in rock specimens of the studied subsurface hydrocarbon reservoir.
Figure 4B:
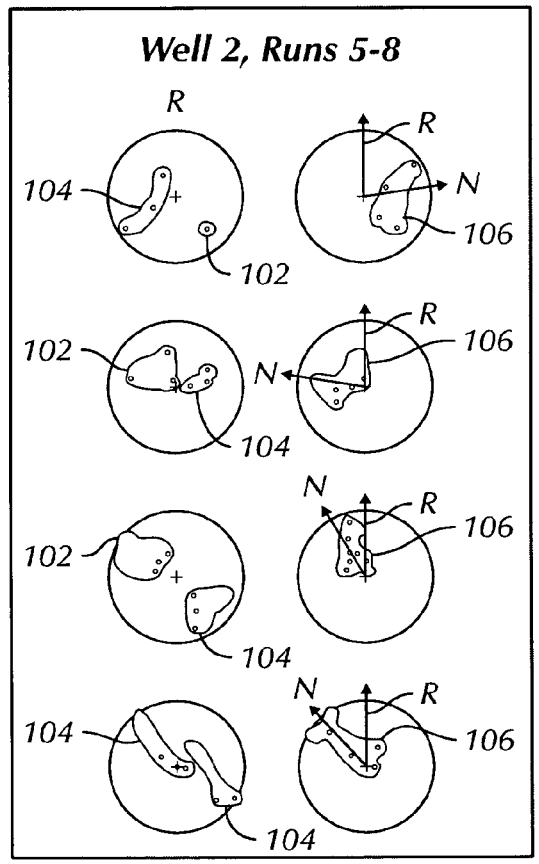
Figure 4C:
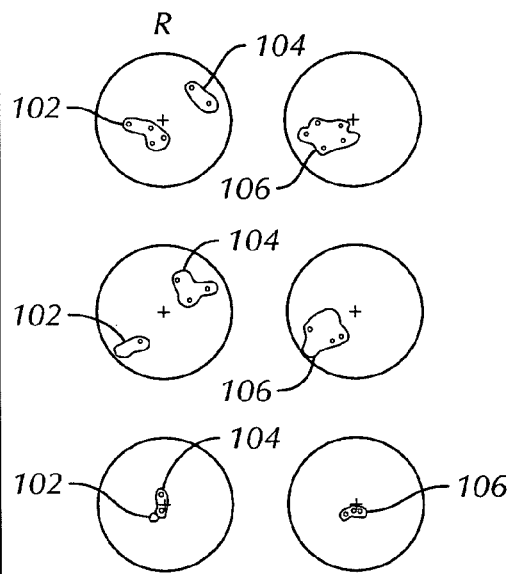
Figure 4D:
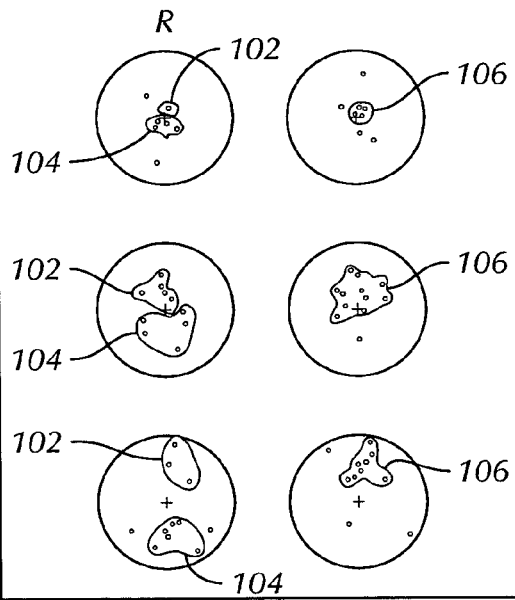

Grain long dimensions are usually aligned parallel with fluid flow. When deposition takes place on an essentially flat bed, a statistical upward imbrication of grain long dimensions ($K_{max}$ axes) occurs in the down-current direction and of grain short dimensions ($K_{min}$ axes) in the up-current direction (FIGS. 3a & 3b). However, under conditions of traction transport, grains may roll over the substrate and this orientation may be fixed during deposition, producing a flow-transverse alignment of grain long dimensions (FIG. 3c). In this case, $K_{max}$ axes usually show no systematic imbrication (i.e. approximately equal numbers are distributed either end of the flow-transverse axis), although $K_{min}$ axes sometimes still show an upward imbrication in the up-current direction.

If the formation has been structurally tilted, then a structural correction must be applied to the grain fabric data, so that grain orientations are specified relative to the paleo-horizontal. This is particularly important for identifying grain imbrications, where systematic deflections of AMS axes of 5° to 10° from the paleo-horizontal or paleo-vertical may be significant. The two wells in the sample formation tested as described herein are known from other data to be located in a mildly folded structure where the bedding is gentle (up to a few degrees). Analysis of image logs from these wells suggests the possible presence of small residual structural dips of about 3° towards the SSE and NE respectively. Grain fabric data from these two wells were corrected for these dips, but the corrections have little effect on the inferred sediment transport directions.

Testing described herein was performed on core samples obtained from a clastic reservoir, a proven, producing gas reservoir in Saudi Arabia was used as a test reservoir and comprised of three units or zones. The zones are designated A, B and C, respectively. The core samples were obtained from a first and a second well designated or well 1, and well 2 into this reservoir. Zone A is known from other data to be deposited mainly in a fluvial/coastal plan setting, but also including alluvial fan and eolian facies. Zone B has fluvial and lacustrine facies, while Zone C has glaciofluvial and eolian facies.

Well testing in the studied field indicates that fractures represent a potentially important contribution to the porosity and permeability, particularly in the lower part of the test reservoir. This finding led to a comprehensive fracture and in-situ stress characterization of the test reservoir, using core, borehole images and azimuthal anisotropy of seismic P-waves. The latter study reveals the presence of potential pockets of open, gas-filled, fractures with an ENE-WSW strike, which are sub-parallel with the regional maximum horizontal in-situ stress direction. Furthermore it was shown that the open fracture density increases drastically with depth, with minimum density in a higher unit (i.e. Zone A) of the reservoir and maximum density in the two lower units (i.e. Zone B and Zone C).

III. Results of Paleomagnetic Core Re-orientation

Incremental thermal demagnetisation analyses identified a stable component of remanent magnetism at relatively low temperatures, below 320° C., in the majority of samples. Further treatment up to 630° C. indicated the possible presence of a high temperature component in approximately 10% of the samples, which may represent the primary magnetism of the formation. However, in the other 90% of the samples the remanent magnetism becomes unstable, or too weak to measure reliably above ~320° C., so that a high temperature component cannot be identified in these samples.

Isothermal remanent magnetism (IRM) acquisition analyses on two representative samples from the reservoir wells indicate that the principal carrier of the remanent magnetism in these sediments is magnetite.

Low temperature (<320° C.) components of remanent magnetisation identified in the sets of specimens from each individual core run in the wells are shown on stereographic projections in FIGS. 4a through 4d. In each of these Figures, the magnetic vectors for the "principal" plugs (those drilled into the reference direction, R) are shown by circles 102 and those from the "antiparallel" plugs (drilled in the opposite direction) by circles 104, in the left column of plots. The two sets of vectors display the expected nearly opposite azimuths, confirming that they have not been affected significantly by the plugging process.

The plots in the right column of each of FIGS. 4a through 4d show the complete set of low temperature magnetic vectors for each run, after applying a 180° correction to magnetic declinations from the "A" plugs. This process effectively refers all magnetic vectors to the primary reference direction R. Application of this correction converts the bimodal, antipodal distributions of points in the left columns into single modal distributions in the right columns of each panel. The mean of the resulting group of vectors for each individual core run is then used to define the direction of North within that core interval. Vectors used in the mean calculation are enclosed in the shaded area 106.

Magnetic inclinations (the angle that the palaeomagnetic vector subtends with the horizontal) in some runs are significantly steeper than the value of ~45° expected for the geomagnetic dipole field at this latitude. This suggests that there may be a residual component of magnetisation in these particular samples, related to drilling and aligned along the core axis. However, drilling-induced components of this type affect the magnetic inclination but not the declination. Since only the declination angle (that the palaeomagnetic vector subtends with the reference azimuth) is used for core re-orientation, the presence of a residual drilling-induced component does not degrade the quality of the paleomagnetic re-orientation data.

Subtracting the mean low temperature paleomagnetic declination from 360° derives the geographic azimuth of the principal reference direction, R, in each core run. A measure of the angular uncertainty in the paleomagnetic re-orientation for each individual core run is given by the circular standard error (c.s.e.) on the mean direction. This is calculated by known methods, such as described in Magnetic Anisotropy of Rocks, Tarling et al., 1993, Chapman & Hall, London, from the dispersion of the group of paleomagnetic vectors used to calculate the mean. The uncertainty ranges from 6° to 17° in a first well and from 3° to 10° in a second well.

Figure 5:
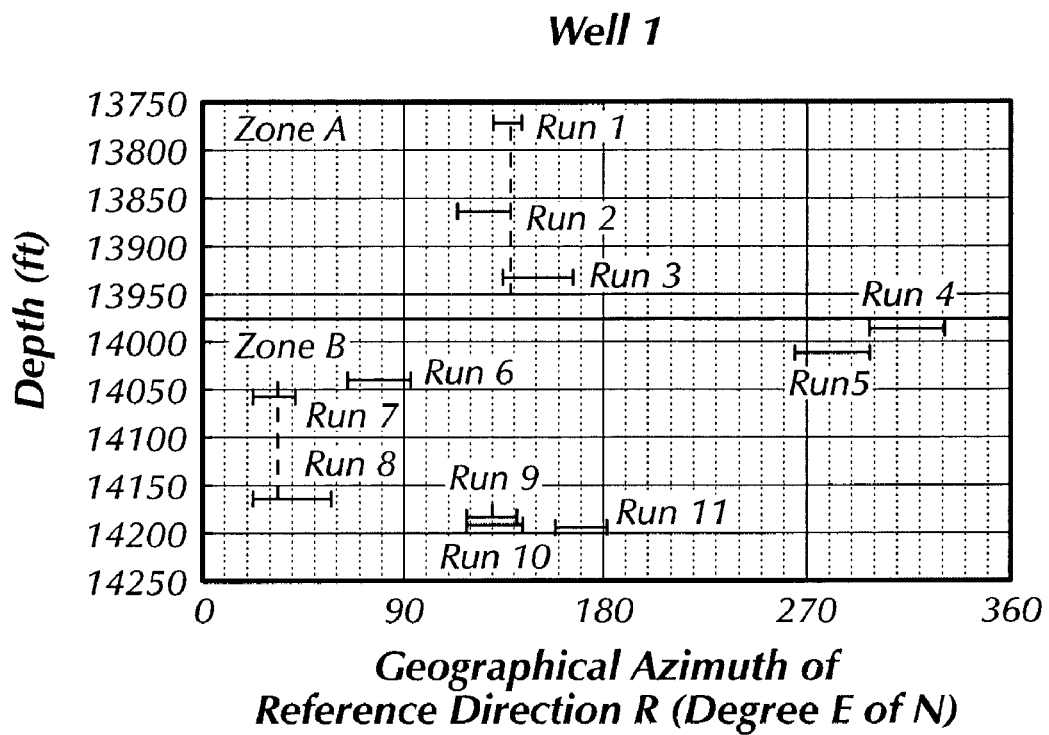
FIGS. 5 and 6 are displays of paleomagnetic re-orientation data from sample cores from the studied subsurface hydrocarbon reservoir.
Figure 6:
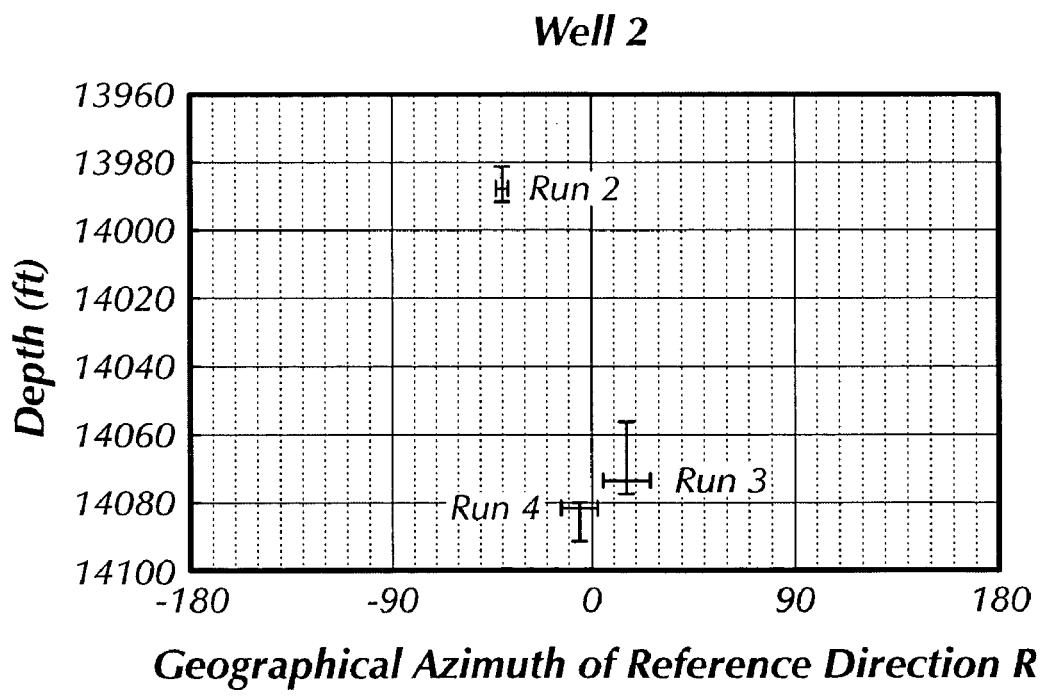

The horizontal bars in FIGS. 5 and 6 show the geographic azimuth of the primary reference direction in each individual core run in wells 1 and 2 in the reservoir from which the data were obtained. The mean value is at the centre of each bar and the bar-length represents the total angular uncertainty in the re-orientation. The vertical bars indicate the depth range of each run.

Figure 7:
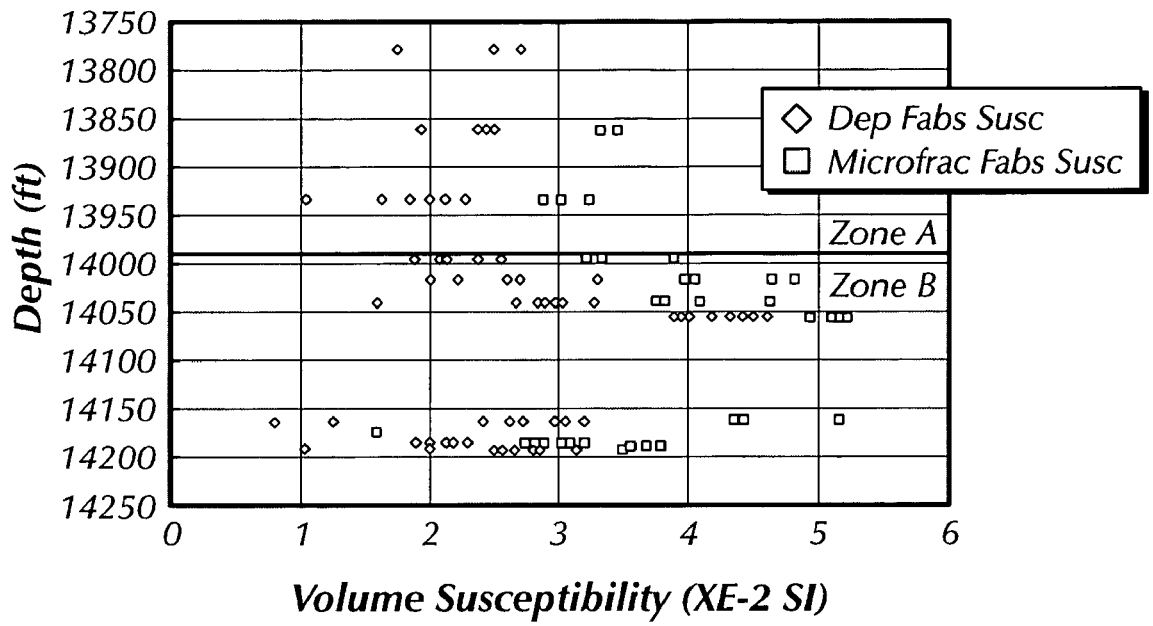
FIG. 7 is a plot of enhanced magnetic susceptibility versus depth from a first well in the studied subsurface hydrocarbon reservoir.
Figure 8:
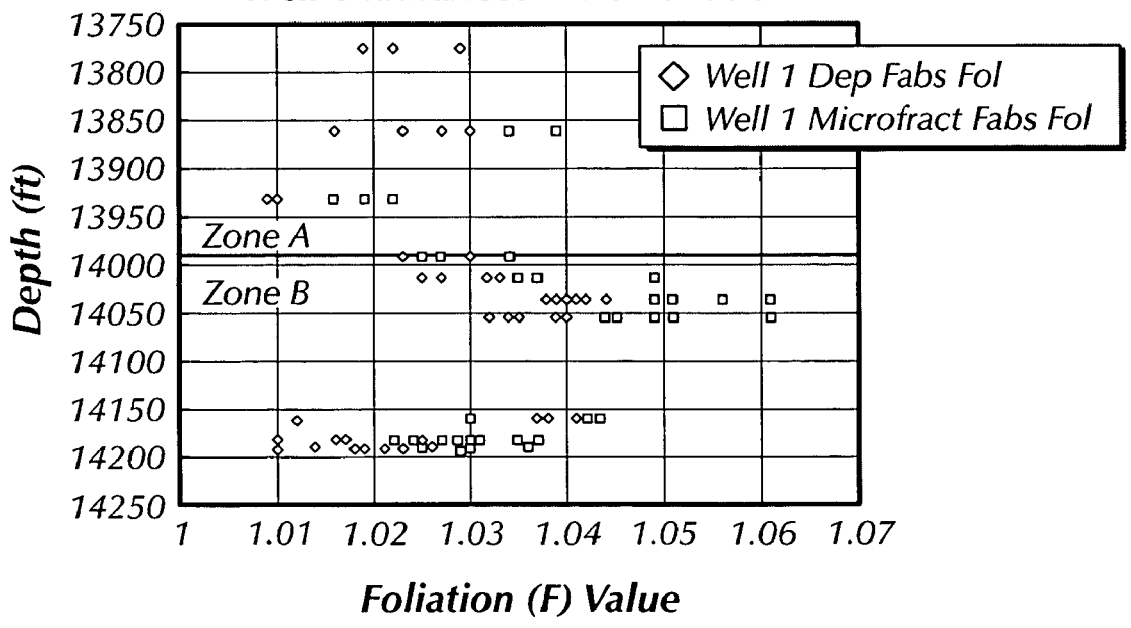
FIG. 8 is a plot of magnetic foliation parameter versus depth from a second well in the studied subsurface hydrocarbon reservoir.

The enhanced magnetic susceptibility and foliation parameter, F, versus depth for all samples from the first well are shown in FIGS. 7 and 8. The plot shows two distinct groups, with similar trends, but one of them has consistently higher values than the other. It is assumed that the higher values for susceptibility and foliation are symptomatic of enhancement of connected pore spaces by microfractures.

Figure 9A:
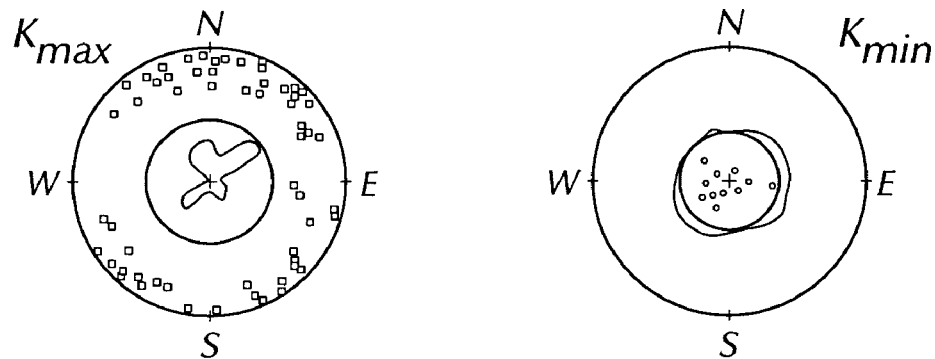
FIGS. 9a, 9b and 9c are displays of the orientation of the principal enhanced AMS axes of non-fractured samples from the same well as that of FIG. 7 in the studied subsurface hydrocarbon reservoir.
Figure 9B:
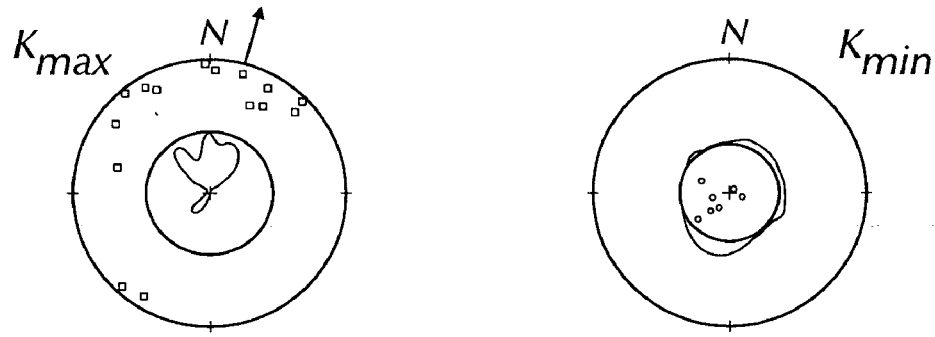
Figure 9C:
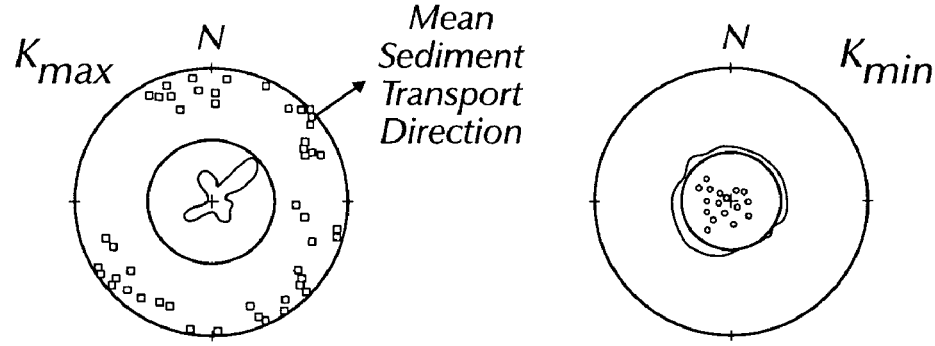

The orientation of the principal enhanced AMS axes of the "non-fractured" samples from the first well is characterized by a $K_{max}$ with a dominant N to NNE azimuth (FIGS. 9a–9c). $K_{min}$ axes show a complementary overall offset from the vertical towards the SSW. This pattern is analogous to that illustrated in FIG. 3b and represents a flow-parallel alignment of grain long axes. The inferred mean sediment transport direction for the uppermost zone in this well is towards the N or NNE (FIG. 9b). Zone B displays a NE-SW mean $K_{max}$ alignment; with a slight dominance of points at the NE end of the axis and a small but systematic complementary offset of $K_{min}$ axes towards the SW (FIG. 9c). This represents a mean sediment transport direction towards the NE.

Figure 10A:
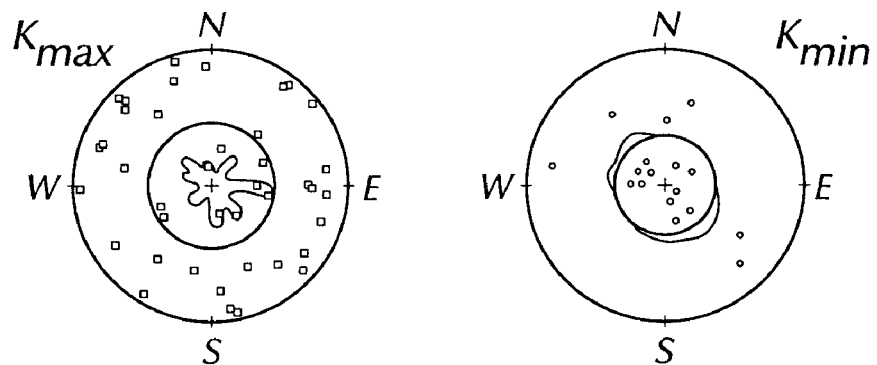
FIGS. 10a, 10b and 10c are displays of the orientation of the principal enhanced AMS axes of microfractured samples from the same well as that of FIG. 7 in the studied subsurface hydrocarbon reservoir.
Figure 10B:
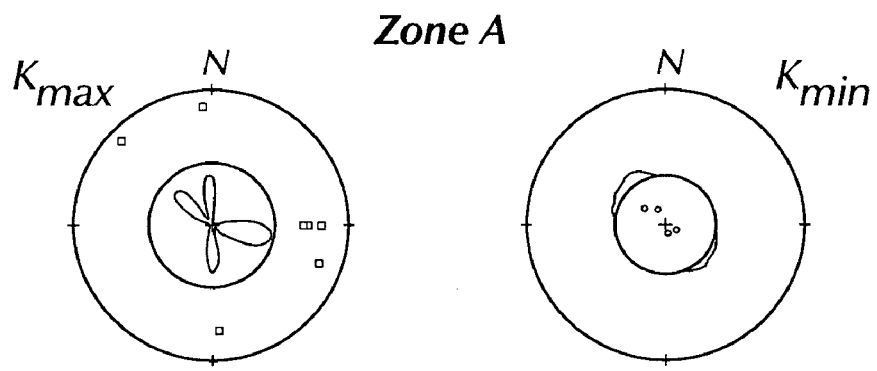
Figure 10C:
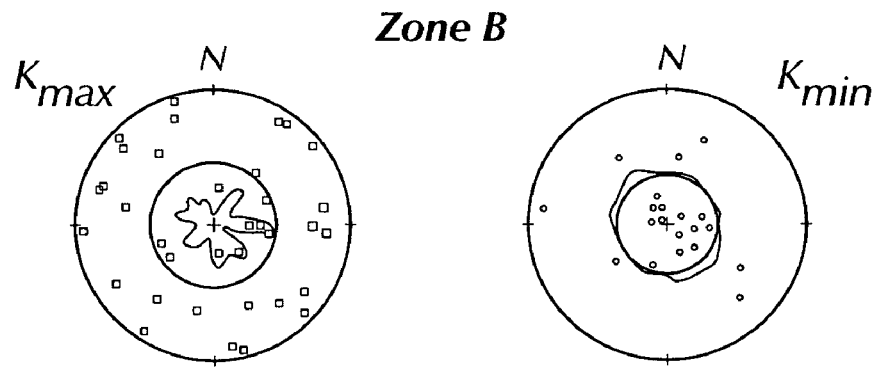
Figure 11:
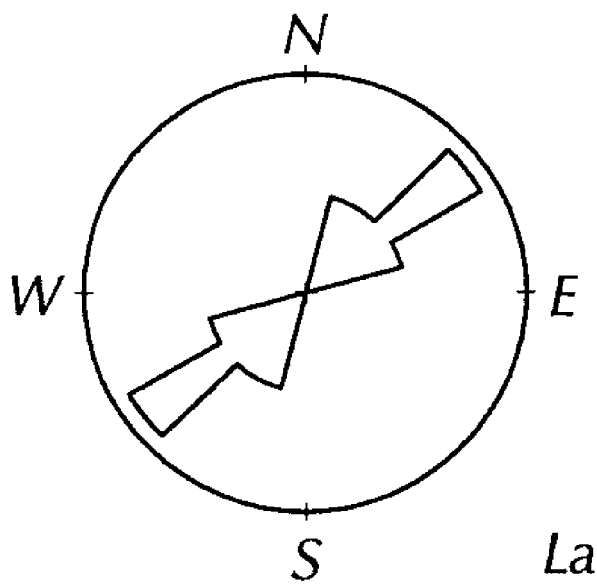
FIG. 11 is a rose diagram of the relative frequency or distribution of microfracture strike directions derived from the magnetic susceptibility anisotropy obtained with the present invention from the subsurface hydrocarbon reservoir samples yielding the data of FIGS. 9a, 9b and 9c.
Figure 11:
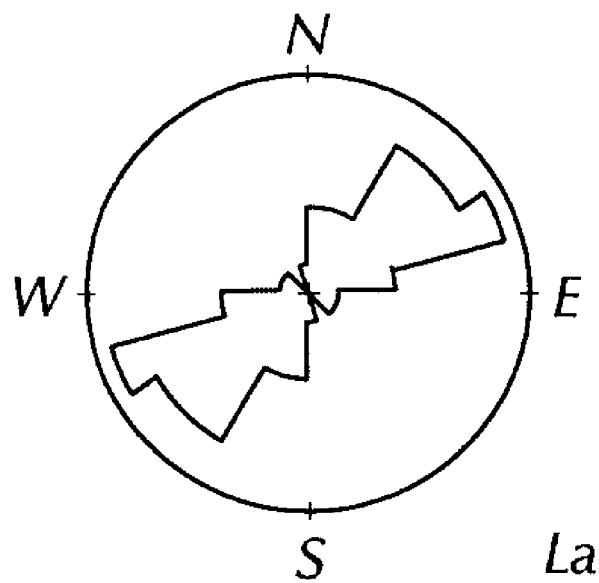

The orientation of the principal enhanced AMS axes of the "microfractured" samples is shown in FIGS. 10a–10c. $K_{max}$ axes in both Zone A, the uppermost zone, and the Zone B, the next lower zone, show a wide spread of azimuths. However, $K_{min}$ axes of samples from both units show distinct groupings in the NW and SE quadrants. Since $K_{min}$ axes effectively represent poles to magnetic foliation planes, these groupings are interpreted as strongly influenced by sets of ferrofluid-filled microfracture planes striking ENE. The relatively gentle angle of dip to the NW and SE respectively of the magnetic foliation is related to the impact of the grain-shapes and non-fracture pore fabric on the bulk AMS, rather than dominant shallow dipping fractures. Corresponding distributions of microfracture strike directions are shown in FIG. 11.

IV. Analysis of Enhanced AMS Data Results

Figure 12A:
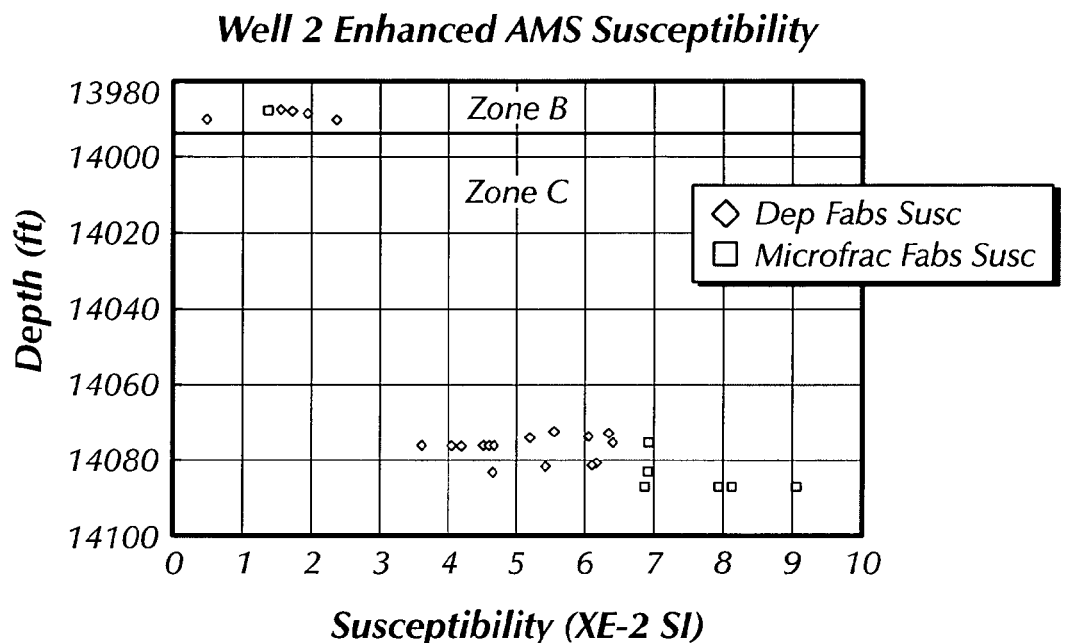
FIG. 12a is a plot of enhanced magnetic susceptibility (per unit volume) versus depth from the same well as that of FIG. 8 in the studied subsurface hydrocarbon reservoir.
Figure 12B:
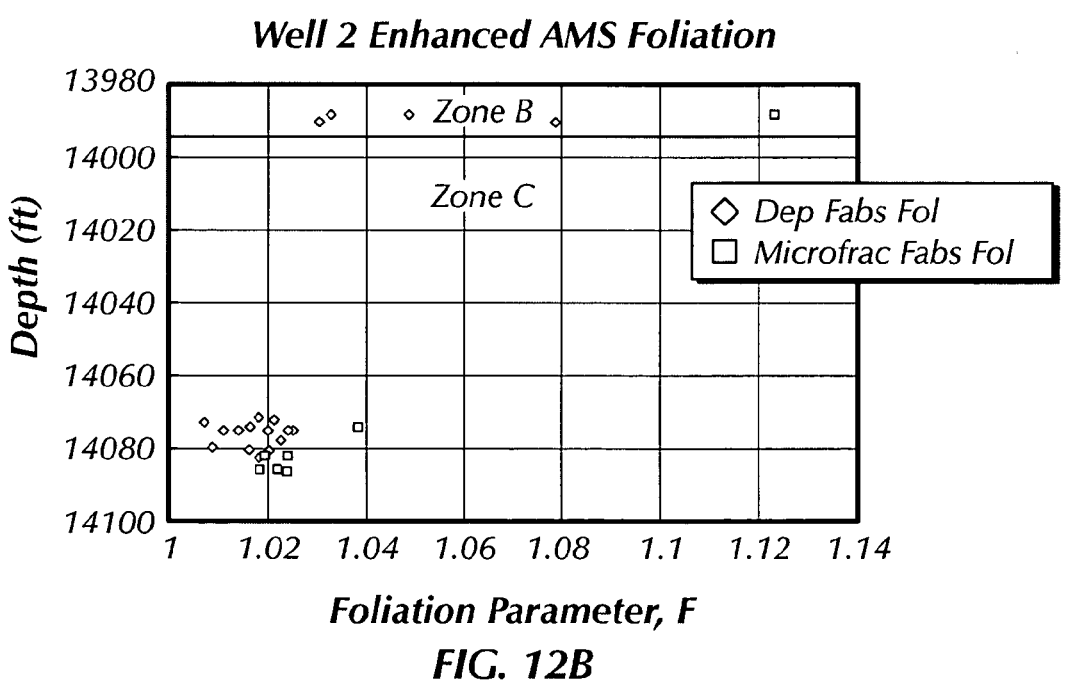
FIG. 12b is a plot of magnetic foliation parameter versus depth from the same well as that of FIG. 8 in the studied subsurface hydrocarbon reservoir.

The enhanced AMS susceptibility (K) and foliation (F) values for the set of samples measured from samples taken of reservoir rock at the second well are plotted in FIGS. 12a and 12b. Based on the magnitude of K and F, eight of the total thirty samples from this well were identified as being characterised by microfracture-type fabrics.

Figure 13A:
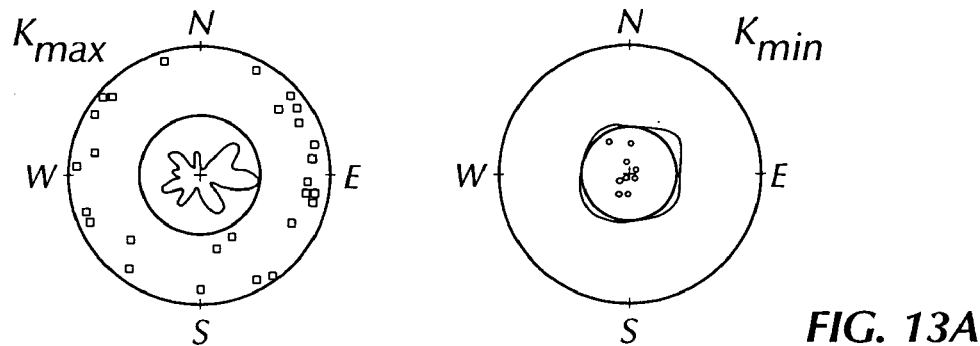
FIGS. 13a, 13b and 13c are displays of the orientation of principal axes of magnetic susceptibility from the samples from the studied subsurface hydrocarbon reservoir yielding the data of FIG. 8.
Figure 13B:
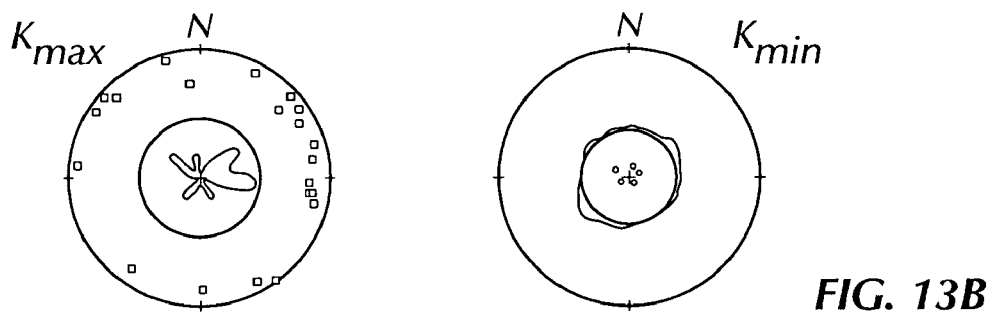
Figure 13C:
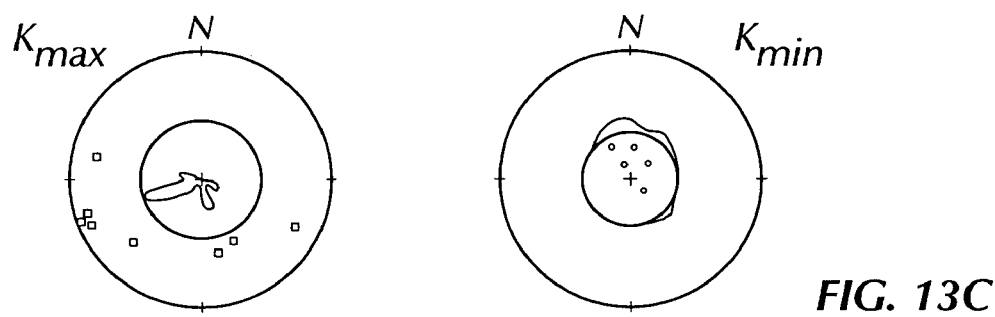

The orientation of the principal enhanced AMS axes is shown in FIG. 13; for all samples (FIG. 13a), and for samples interpreted as non-fractured and fractured (FIGS. 13b and 13c respectively).

Figure 13D:
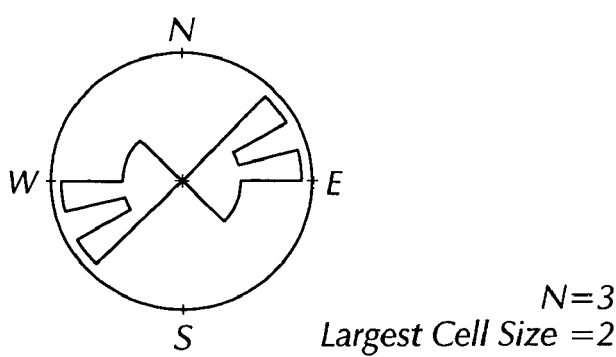
FIG. 13d is a rose diagram of the relative frequency or distribution of microfracture strikes from the non-fractured samples from which the data of FIGS. 13a, 13b and 13c were obtained.

$K_{max}$ axes for non-fractured samples are loosely grouped around a mean ENE direction and $K_{min}$ axes are nearly vertical, display a small complementary offset from the vertical towards the SSW. These results are similar to those illustrated in FIG. 3b and they represent a flow-parallel alignment of grain long dimensions, produced by sediment transport towards the ENE (indicated by the arrow at the perimeter of the plot in FIG. 13b) The "microfractured" samples (FIG. 13c), in both the Zone A and the Zone B, are characterized by a mean WSW-azimuths of $K_{max}$ axes. The $K_{min}$ axes of samples from both units show distinct groupings in the NNW and SSE quadrants. Since $K_{min}$ axes effectively represent poles to magnetic foliation planes, these groupings are interpreted as strongly influenced by sets of ferrofluid-filled microfracture planes striking ENE. The relatively gentle angle of dip to the NW and SE, respectively, of some of the magnetic foliation is related to the impact of the grain-shapes and non-fracture pore fabric on the bulk AMS, rather than dominant shallow dipping fractures. Corresponding distributions of microfracture strike directions are shown in FIG. 13d.

Figure 14:
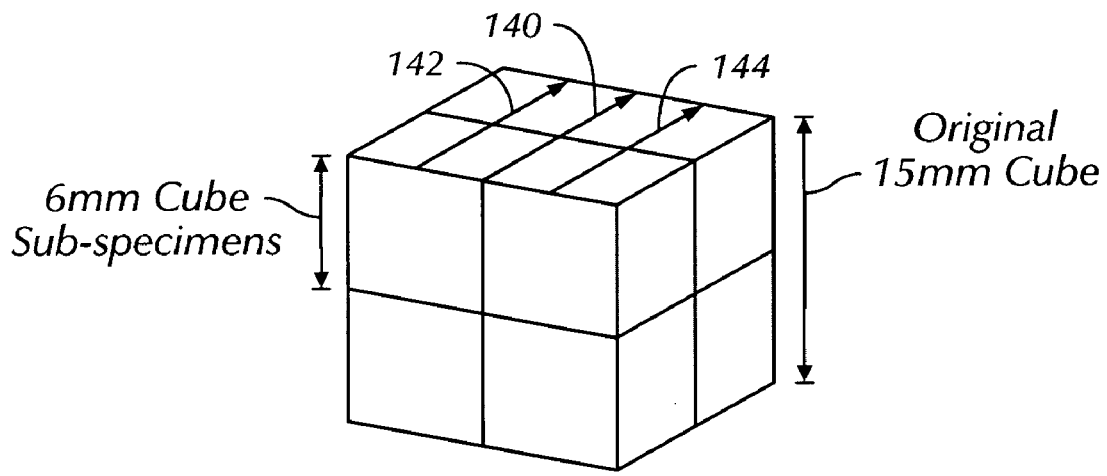
FIG. 14 is a schematic diagram of cutting procedures used in obtaining test specimens from larger samples for examining sample-size (scale) effect on the detected fractured fabric and non-fractured fabric in the studied hydrocarbon reservoir rock.

To examine the variability of non-fractured fabric (depositional pores and grain fabric) on different spatial scales, two of the enhanced AMS fifteen mm cubes that contribute to the principal mode in FIG. 13B, with easterly $K_{max}$ azimuths, were cut into eight separate (~6 mm) sub-cubes and their AMS re-measured. The cutting procedure is schematically illustrated in FIG. 14. An arrow 140 indicates an orientation line on the original sample and arrows 142 and 144 indicate orientation lines on upper surfaces of the sub-cubes.

Figure 15:
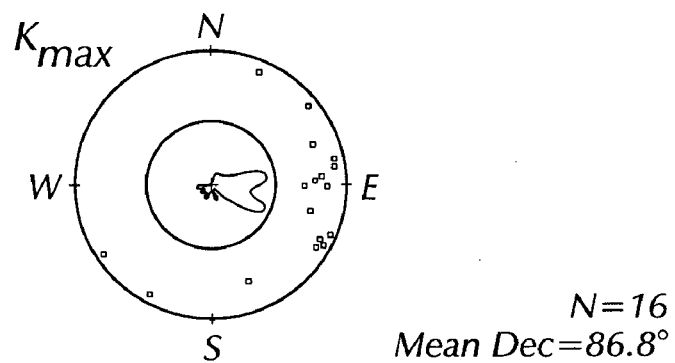
FIG. 15 is a rose diagram of the relative frequency or distribution of enhanced magnetic susceptibility data obtained from test samples cut according to FIG. 14 from the studied hydrocarbon reservoir.
Figure 15:
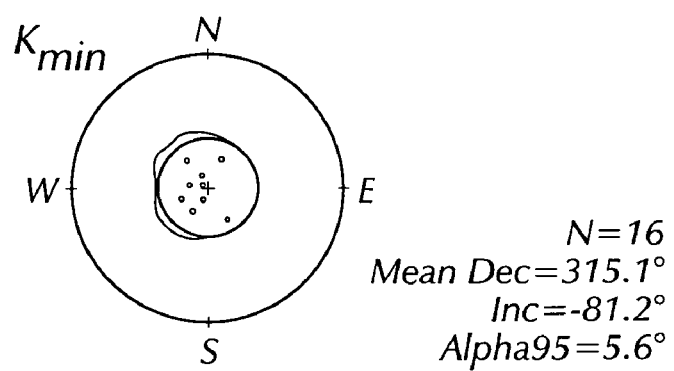

Results from the "non-fractured" sub-cubes (FIG. 15) show a clear grouping of sub-sample $K_{max}$ axes towards the east and a complementary offset of $K_{min}$ axes towards the west that confirms that the enhanced AMS grain/non-fractured pore fabric is consistent on scales varying from ~6 to 15 mm and also that it represents a flow-parallel long axis alignment.

Figure 16:
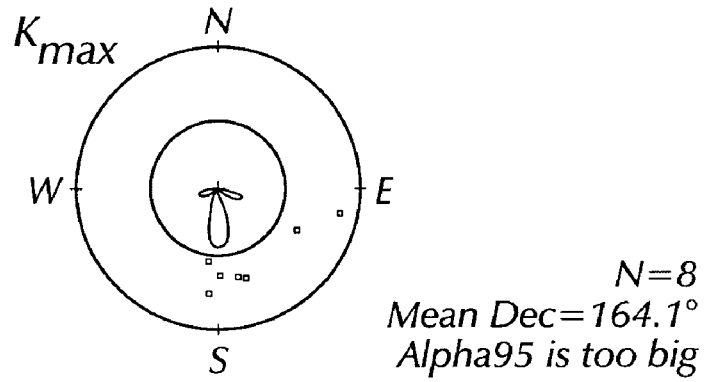
FIG. 16 is a rose diagram of the relative frequency or distribution of enhanced magnetic susceptibility data obtained from test samples from the studied subsurface hydrocarbon reservoir.
Figure 16:
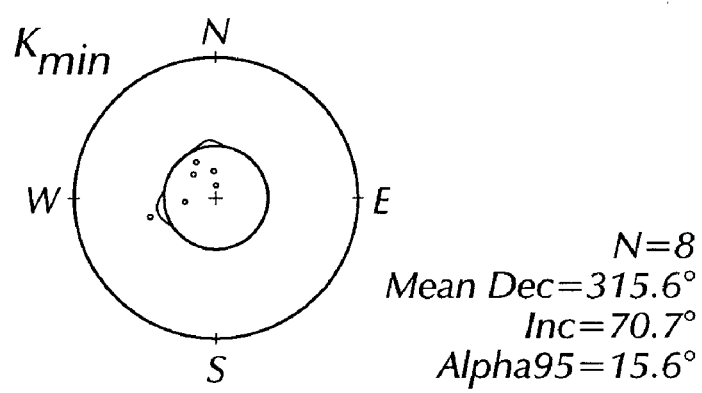

The above process was repeated for one of the "fractured" samples that is characterized by a N-NNE azimuth of $K_{min}$, in FIG. 13c. The orientations of the enhanced-AMS ellipsoid axes for the eight sub-samples from this cube are shown in FIG. 16. Six of the sub-samples show $K_{min}$ with N-NNE azimuth (FIG. 15, lower), indicating that the AMS foliation has an E-W to ENE strike, similar to that identified from larger cube samples. Thus the enhanced AMS ellipsoid and the causative microfractures have a consistent orientation on spatial scales ranging from ~6 mm to 15 mm.

V. Reservoir Characterization

It is possible to assume that the "non-fractured" enhanced AMS fabric is related to depositional-environment (as shown in FIGS. 3a–3c), they are used to determine the sediment transport directions for the Zone A, B and C in the test reservoir.

Data for the Zone A are restricted to three core runs from well 1 (FIG. 9b). All three runs exhibit similar grain long axis alignments and the overall mean sediment transport direction is towards the NNE. Depositional fabric for the Zone B reservoir is available from one run in well 2 and eight runs in well 1. The mean sediment transport direction at both wells is towards the NE. Data for the Zone C is limited to two runs in well 2. The corresponding sediment transport direction is towards the ENE.

These results indicate that the reservoir sands in all three units were derived from a source area that lay approximately to the SW of the field. Furthermore, on the basis of the rather limited grain fabric data available from the Zones A and C, there is some suggestion that the source might have migrated progressively from the WSW to the SSW with time during the deposition of the reservoir.

Figure 17:
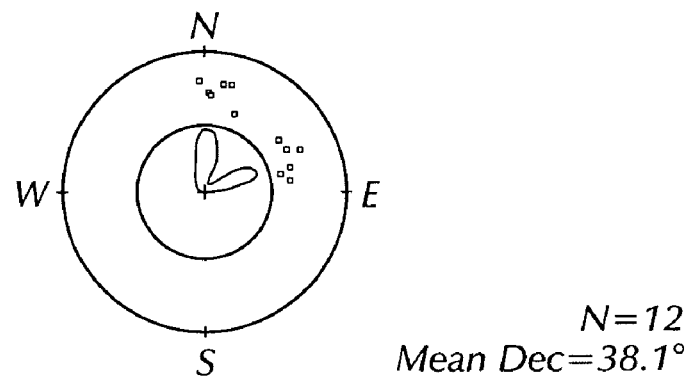
FIG. 17 is a rose diagram of the relative frequency or distribution of cross-bedding directions, in a unit of the studied subsurface hydrocarbon reservoirs, measured from a well core and using goniometry.

Cross bedding directions in the Zone A were measured in the well 1 core at several different depths, within the intervals that were sampled for the AMS work. Results were referred to geographic North using the available palaeomagnetic core re-orientation data. The dip direction is bimodal with NNE and ENE azimuths respectively (FIG. 17). Cross bedding directions are indicative of the flow directions and sediments source. The observed overall mean direction towards the NE in this well agrees with the mean sediment transport direction derived from the enhanced AMS fabric data. This provides corroborative evidence, supporting the reliability of the sediment transport direction determined from the enhanced AMS fabric data.

Figure 18A:
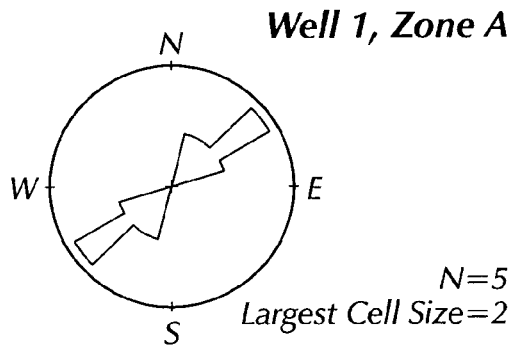
FIGS. 18a, 18b, 18c and 18d are rose diagrams of the relative frequency or distribution of microfracture strikes obtained according to the present invention fro the wells yielding the data of FIGS. 7 and 8.
Figure 18B:
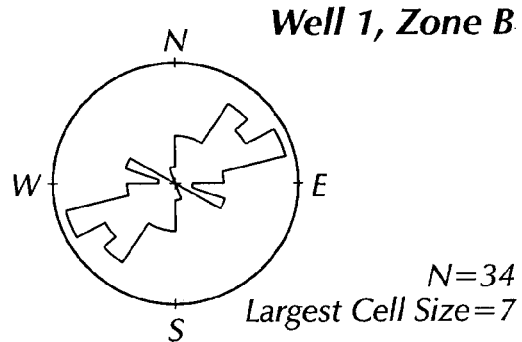
Figure 18C:
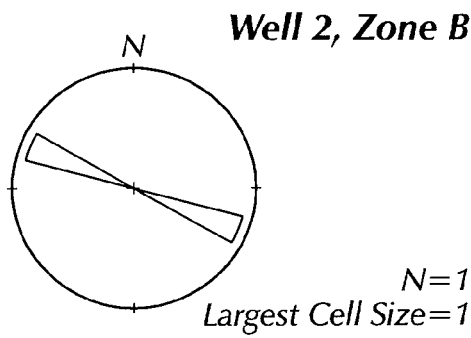
Figure 18D:
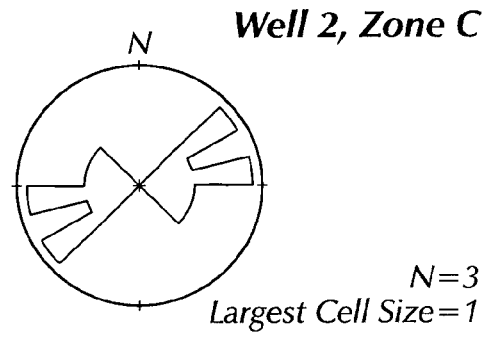

The distinctive strike of the enhanced AMS foliation "F" is assumed to reflect the dominant fracture set strike in the "fractured" samples. The measured strikes in wells 1 and 2, are plotted as rose diagrams in FIGS. 18a, 18b, 18c and 18d. Principal microfracture strike modes are aligned NE-SW or ENE-WSW in the Zones A and B of well 1 and also in the Zone C of well 2. An apparent exception to this trend is the single specimen identified as having a microfracture-type fabric in the Zone B of well 2 (FIG. 18c).

Figure 18E:
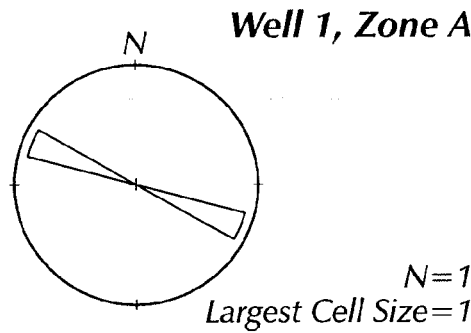
FIGS. 18e, 18f and 18g are rose diagrams of the relative frequency or distribution of strike directions of visible fractures in the core samples from which the data of FIGS. 18a, 18b, 18c and 18d were obtained.

However, this identification is tentative, since the enhanced AMS susceptibility of this sample is not higher than the "non-fractured" measurement (although it does exhibit an enhanced magnetic foliation value, with a direction that is distinct from that of samples from this well with depositional fabrics). The orientations of visible fractures in the whole core of well 1, within the AMS-sampled sections of core were measured by core goniometry. All but one of the twenty five fractures measured in this well are located in the Zone B. The strike of the single fracture plane measured in the Zone A (FIG. 18e) is nearly orthogonal to the trend of microfractures in this unit (FIG. 18a). The former is a syndepostitional fault that occurred in "soft sediment", whereas the microfractures detected from enhanced AMS are of tectonic origin.

Figure 18F:
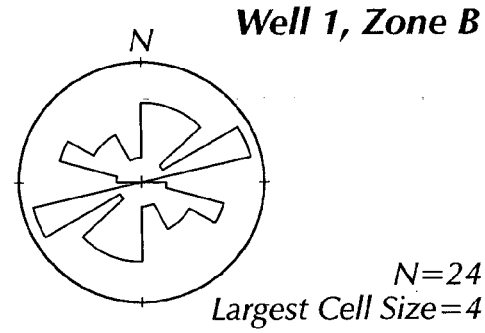
Figure 18G:
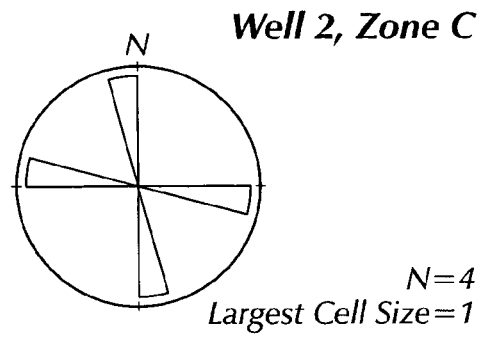

The visible fractures in the Zone B of well 1 display three separate sets, with NNE-SSW, ENE-WSW and ESE-WNW strikes respectively (FIG. 18F). The first two of these are in reasonable agreement with the mean ENE-WSW microfracture trend. The third set is broadly similar to a weak mode in the Zone B microfracture strike distribution of well 1 (FIG. 18b) and also the single observation from the Zone B of well 2 (FIG. 18c).

The study shows that the occurrence of microfractures is not uniquely controlled or linked to the occurrence of visible fractures in the core. Some visible fractures in the test reservoir are accompanied by microfracture fabrics in adjacent core intervals while others are not.

VI. Reservoir Petrophysics

The total volume of ferrofluid within each plug sample can be calculated from the known magnetic susceptibility of the ferrofluid, coupled with results from previous calibration experiments. Knowing the sample volume, this provides a measure of the "AMS— porosity" of the sample, using the following equation:

$$\text{Effective porosity} = SUM(X/0.45) \tag{4}$$

where X is the enhanced susceptibility

Figure 19:
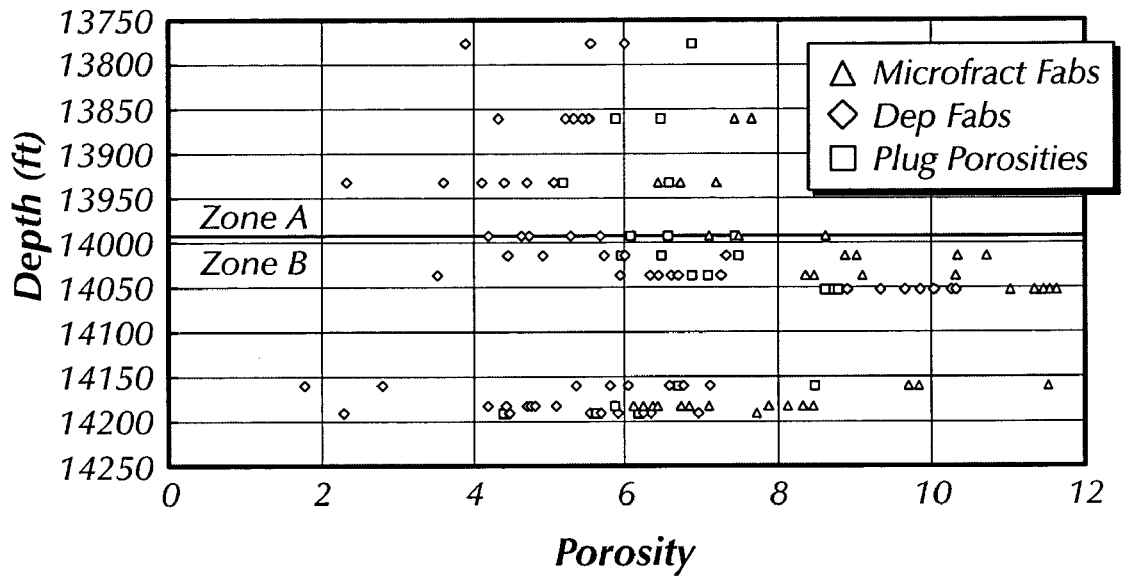
FIGS. 19 and 20 plots of porosity values derived from enhanced magnetic susceptibility for rock fabric from the studied subsurface hydrocarbon reservoir as a function of depth.
Figure 20:
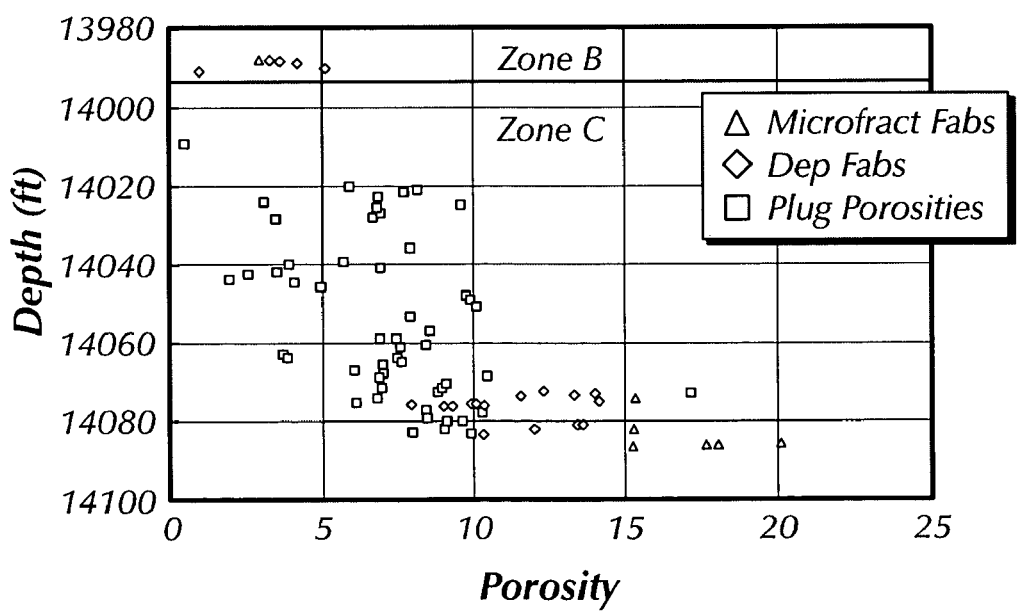

AMS porosity values determined in this way for well 1 and well 2 are plotted in FIGS. 19 and 20 respectively. Directly measured porosity values obtained from conventional core tests on other plug samples from the AMS-tested core intervals are also plotted.

Figure 21A:
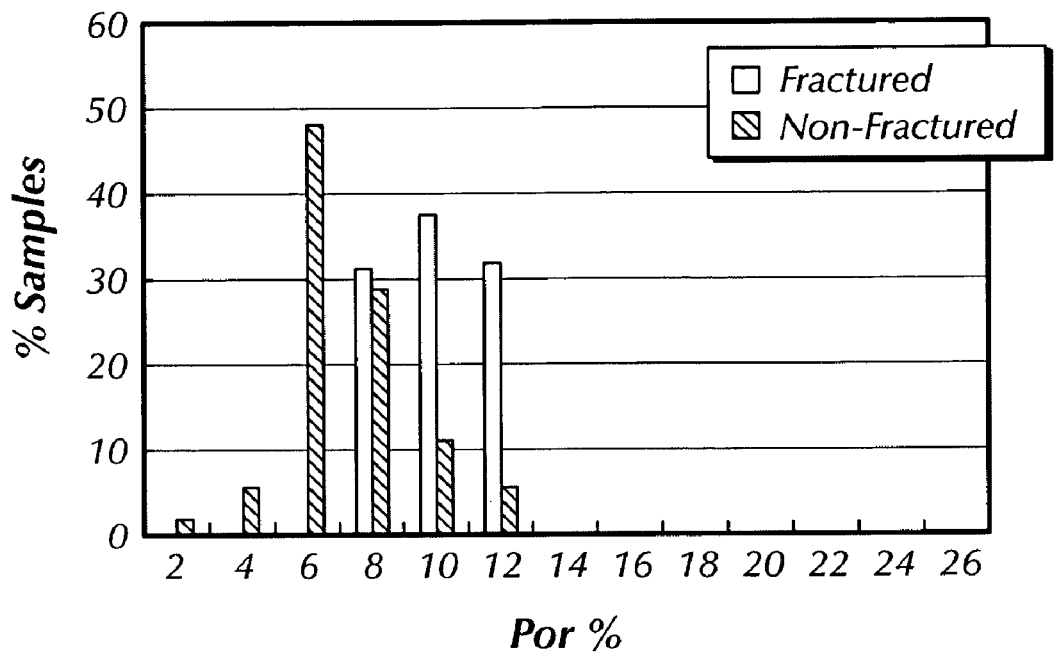
FIGS. 21a and 21b are plots of frequency distribution of porosity values obtained with the present invention from fractured and non-fractured samples of the studied reservoir.
Figure 21B:
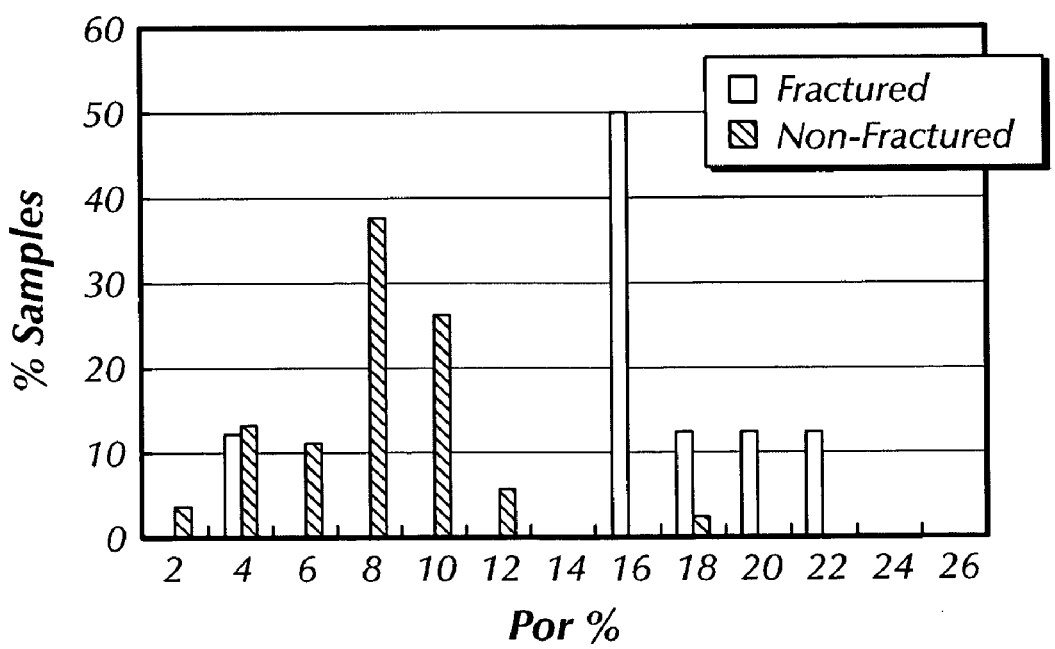

For both wells, AMS porosity values for samples with microfracture-type fabrics are systematically greater than those for samples with depositional-style fabrics This reflects the porosity enhancement caused by the presence of the microfractures. The increase in the reservoir porosity due to fracture occurrence ranges from 30.66% to 47.93% in Zone B and Zone C. The mean porosity in well 1 from Zone A increases by 51.52% due to fracture occurrence. The impact of fractures on porosity is also illustrated in the histograms of porosity distribution in fractured and non-fractured samples in each of the studied wells (FIGS. 21a and 21b).

The conventionally measured porosity values for well 1 (FIG. 19) show a similar trend with depth to the enhanced-AMS porosity values. Thus, both sets of values increase with depth, to a peak at about 14,050 ft, then show a possible small decline near the base of the core. However, it was not possible to directly compare individual values on a sample-by-sample basis, because the conventional porosity plugs were not taken from the same depths as the AMS plugs.

Preferred orientations of pore long axes ($K_{max}$ azimuths) in the wells 1 and 2 are plotted as contour diagrams in FIGS.

Figure 22A:
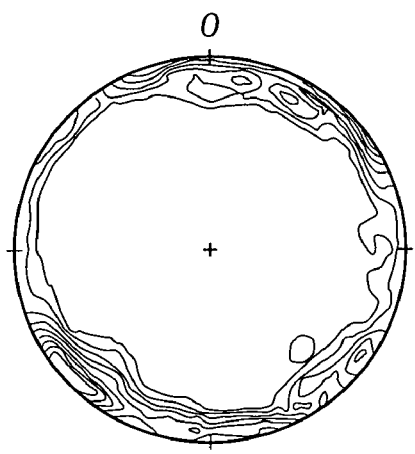
FIGS. 22a, 22b and 22c are contour diagram plots of preferred orientation of pore long axes and inferred maximum permeability axes from samples and inferred maximum permeability axes of the studied subsurface hydrocarbon reservoir rock.
Figure 22B:
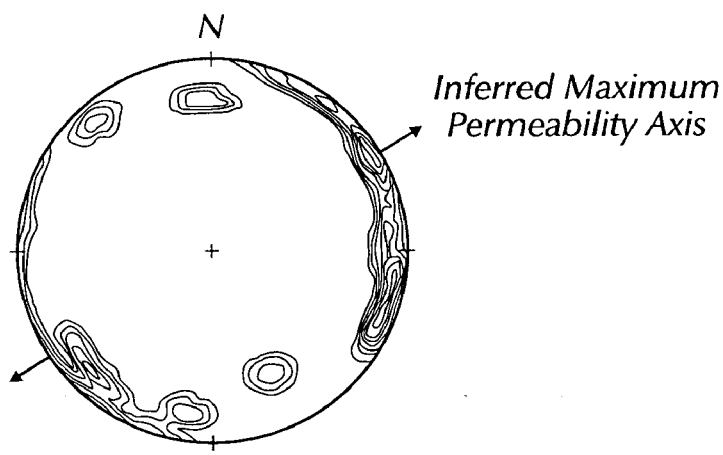
Figure 22C:
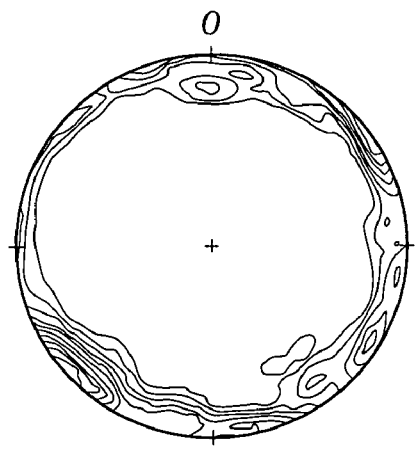
Figure 23:
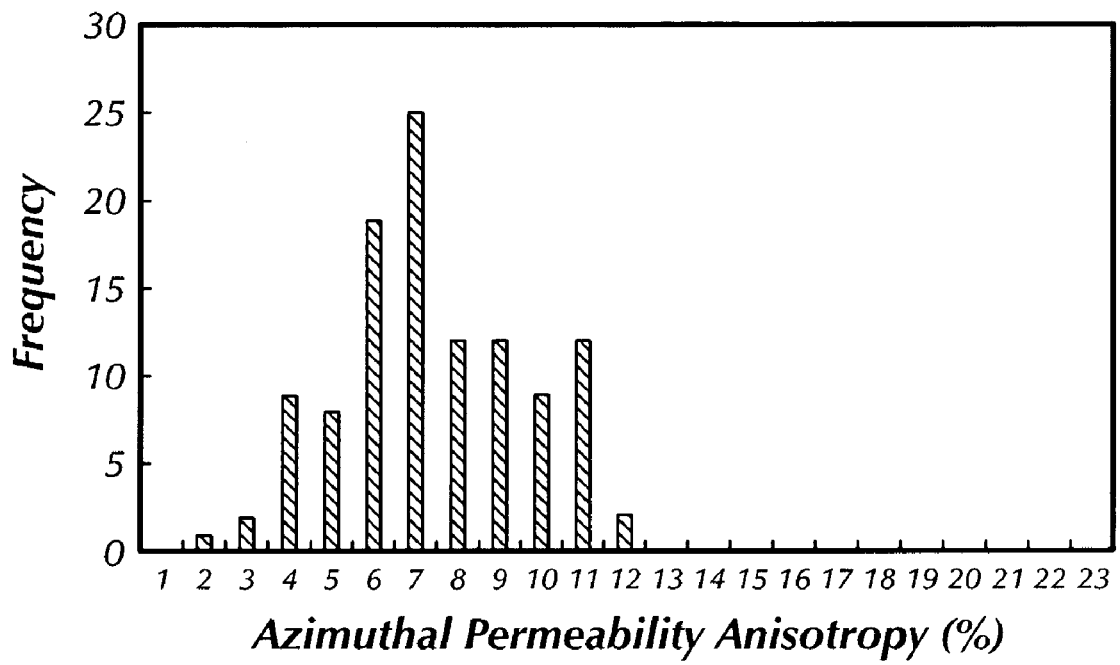
FIG. 23 is a frequency plot of azimuthal permeability anisotropy obtained with the present invention from a first reservoir well.
Figure 24:
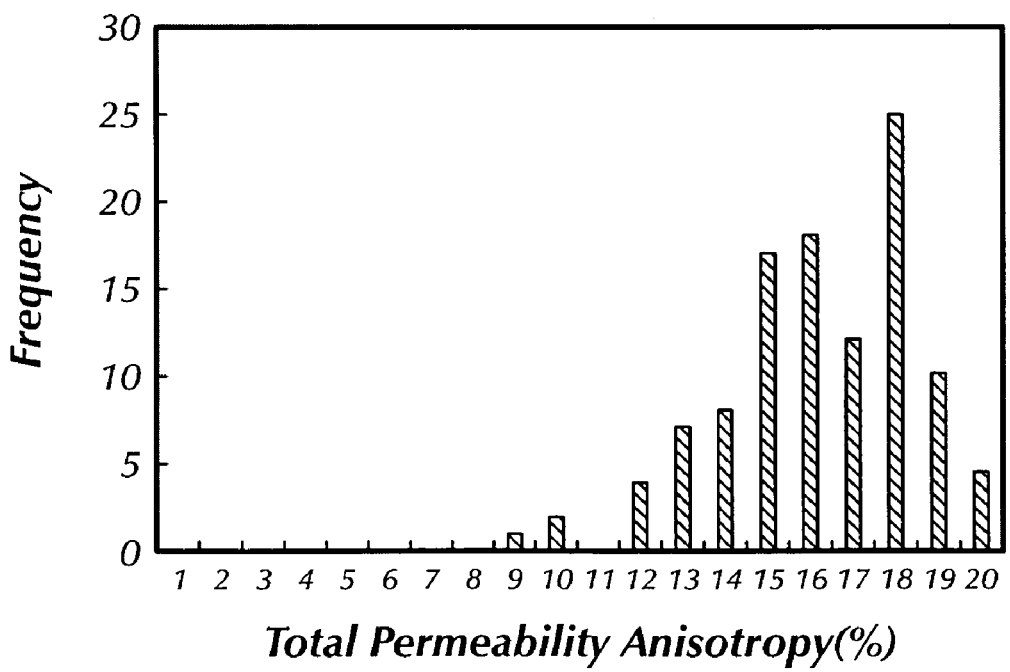
FIG. 24 is a frequency plot of total permeability anisotropy obtained with the present invention from the same reservoir well as the data shown in FIG. 23.
Figure 25:
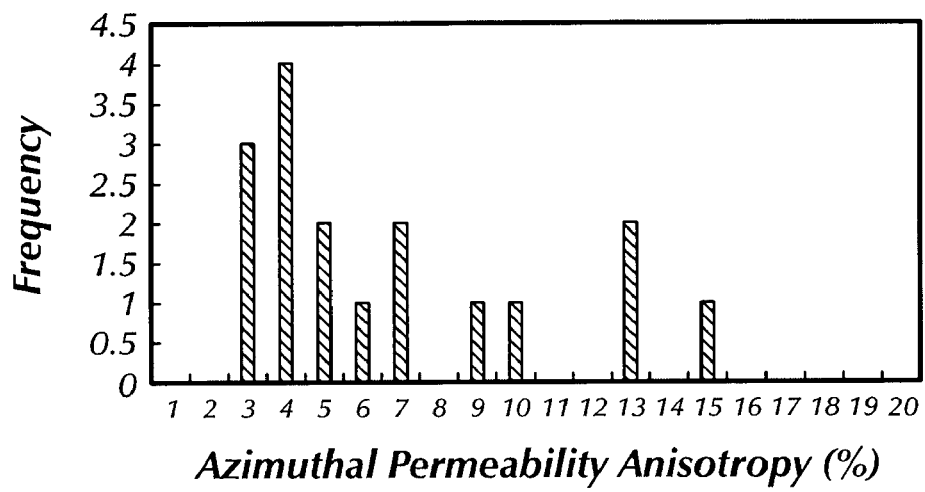
FIG. 25 is a frequency plot of azimuthal permeability anisotropy obtained with the present invention from a second reservoir well.
Figure 26:
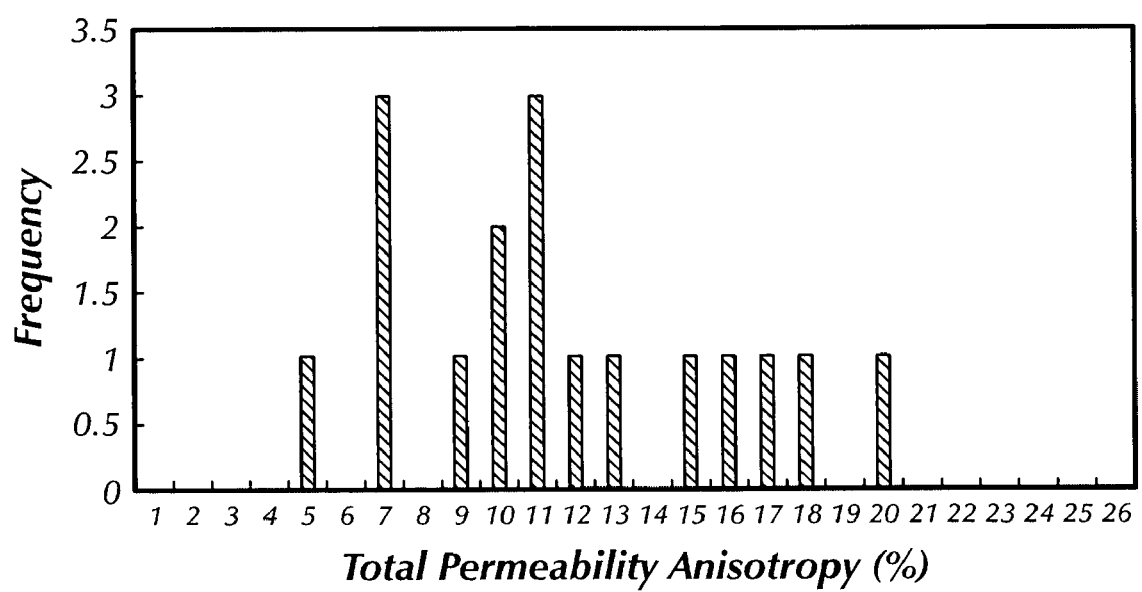
FIG. 26 is a frequency plot of total permeability anisotropy obtained with the present invention from the reservoir well yielding the data regarding FIGS. 23 and 24.

22a and 22b. FIG. 22c is a plot for both wells combined. Both wells display a clear principal maximum with a NE-SW trend and well 2 shows also a secondary maximum with a WNW-ESE trend. The NE-SW trend clearly dominates in the combined plot for both wells (FIG. 22c).

The degree of permeability anisotropy can be calculated from the percentage of enhanced-AMS, using a standard calibration curve:

$$\text{Perm. Anisotropy} = \text{POWER}(X, 0.5) * 8.1 \qquad (5)$$

where $X = \text{SUM}((L-1)*100)$ for azimuthal anisotropy, and $X = \text{SUM}((P-1)*100)$ for total anisotropy.

This calibration has been performed over a period of time, by comparing AMS-derived data with directly measured permeability anisotropy values. The calibration is based on results obtained from studies of North Sea porous reservoirs (fluvial and deepwater sands) but it is regarded as being generally applicable.

Permeability anisotropy data are expressed conveniently by two parameters. The first is the azimuthal permeability anisotropy, which represents the percentage difference between maximum and minimum permeability in the horizontal plane (i.e. parallel to bedding). The second is the total permeability anisotropy, which quantifies the percentage difference between the overall maximum and minimum permeability in three dimensions. Histograms of these two parameters for wells 1 and well 2 are shown in FIGS. 23, 24, 25 and 26, respectively. Azimuthal permeability anisotropy varies from ~3% to 15% in both wells, with a mean of ~6.5% and total permeability anisotropy ranges from 5% to 28% with an overall mean of ~14%.

Mean permeability anisotropy values for samples with microfracture-type and depositional-style fabrics indicate no significant difference between the degrees of permeability anisotropy of samples with the two types of fabric in either well (within the variability represented by the standard deviation on the mean).

These results suggest that although the presence of microfracture fabrics increases the porosity and probably also the permeability, it does not appear to have a significant effect on the degree of permeability anisotropy. The maximum permeability direction in samples with microfracture fabrics is likely to lie within the mean microfracture plane, whereas that of samples with depositional fabrics is controlled by the pore fabric. Microfracture strikes in the test reservoir are sub-parallel with the pore long axis alignment, so that maximum permeability directions associated with the two types of fabric are similar.

These values are typical of those encountered in many other clastic reservoirs and they are sufficiently high to have a significant influence on the fluid flow properties of the reservoir. It is appropriate, therefore, that the observed permeability anisotropy be taken into account in the reservoir model, particularly since the direction of maximum permeability is consistent between the two wells.

The AMS test setup used does not allow for accurate permeability measurements. However assuming that the conventional core plug tests of porosity and permeability applies to the AMS tested samples, fracture impact on permeability can be assessed. Using the porosity-permeability correlation from conventional tests from well 1 of core plugs it is estimated that microfractures increase average permeability by 74.69% in Zone B and 59.89% in Zone A.

VII. Natural AMS Characteristics

Figure 27:
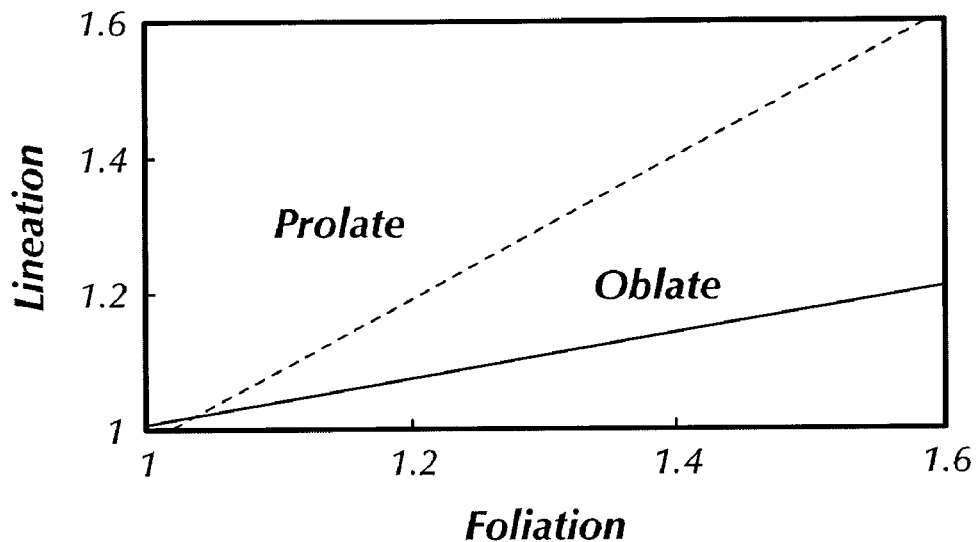
FIG. 27 is a Flinn diagram of the natural magnetic susceptibility anisotropy parameters obtained for samples from the wells in the subsurface hydrocarbon reservoir yielding the data of FIGS. 7 and 8.
Figure 28:
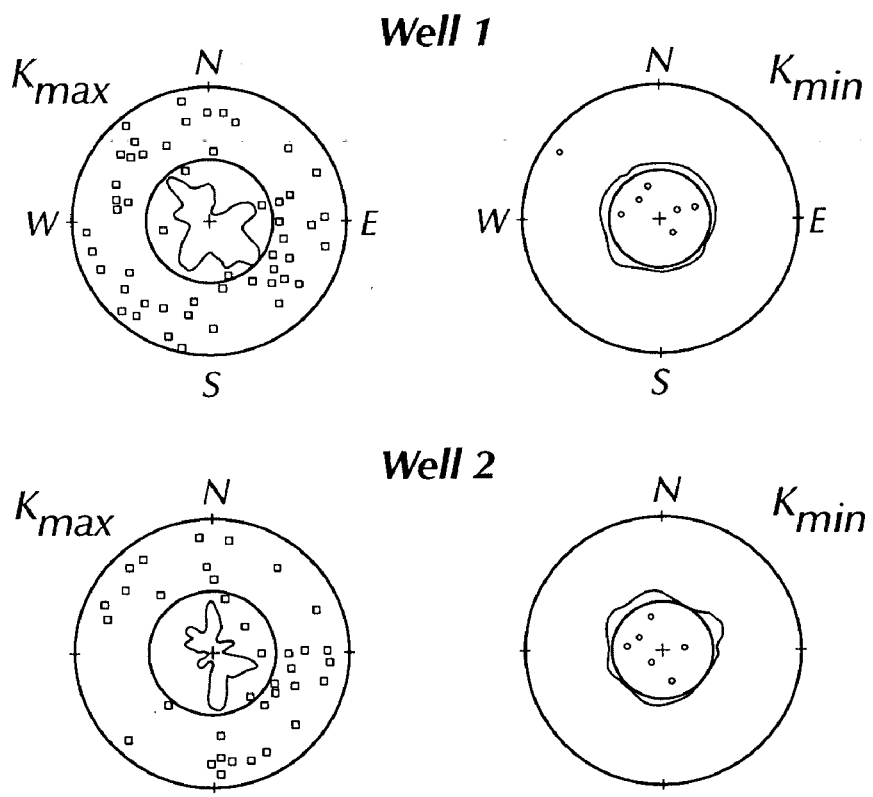
FIG. 28 is a display of the orientation of the $K_{max}$ and $K_{min}$ of the natural magnetic susceptibility anisotropy of the samples from the studied subsurface hydrocarbon reservoir.

The natural AMS ellipsoid plotted from samples (FIGS. 27 and 28) reflects that of magnetic mineral fabric of the rock. The shapes of the natural magnetic grains (FIG. 27) include both prolate and oblate types. However the Flinn diagram of FIG. 27 indicates that the oblate shape grains are more common, with a linear correlation between the lineation (L) and the foliation (F):

$$L = 0.40F + 0.62, \text{ with } R^2 = 0.43 \text{ for Well 1} \qquad (6)$$

$$L = 0.33F + 0.69, \text{ with } R^2 = 0.53 \text{ for Well 2} \qquad (7)$$

The orientation of the natural AMS ellipsoid ($K_{max}$ and $K_{min}$ axes) for both wells display a much wider dispersion than the corresponding enhanced AMS data. This is reflected by a comparison of FIG. 28 with FIGS. 9 and 13 respectively. This is largely due to the fact that the natural AMS is very weak and close to the instrument noise level for many samples. Consequently, a large part of the scatter in FIG. 28 may be attributed to instrumental noise. However, both wells 1 and 2 show a weakly defined $K_{max}$ mode, picked out by the co-centred smoothed rose plot, which is nearly orthogonal to the mean sediment transport direction inferred from the enhanced AMS data, as contrasted with FIGS. 9 & 13).

This feature is characteristic of a flow-transverse alignment of grain long axes. Such a combination of flow-parallel enhanced AMS (quartz grain fabric) and flow-transverse natural AMS (magnetite fabric) have been observed in other studies of fluvial and turbidite sediments, where traction transport processes dominate. It appears to reflect the tendency for relatively light quartz grains to become aligned with their long axes parallel with fluid shear, while denser magnetite grains tend to roll over the substrate, with their axes transverse to the flow direction.

Figure 29A:
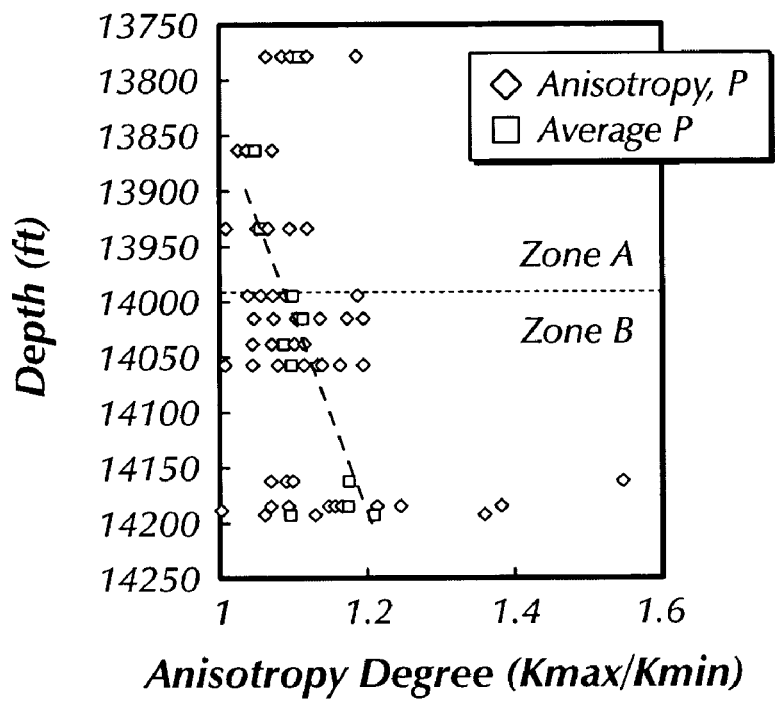
FIG. 29a is a plot of natural AMS degree versus depth in a well in the studied subsurface reservoir.
Figure 29B:
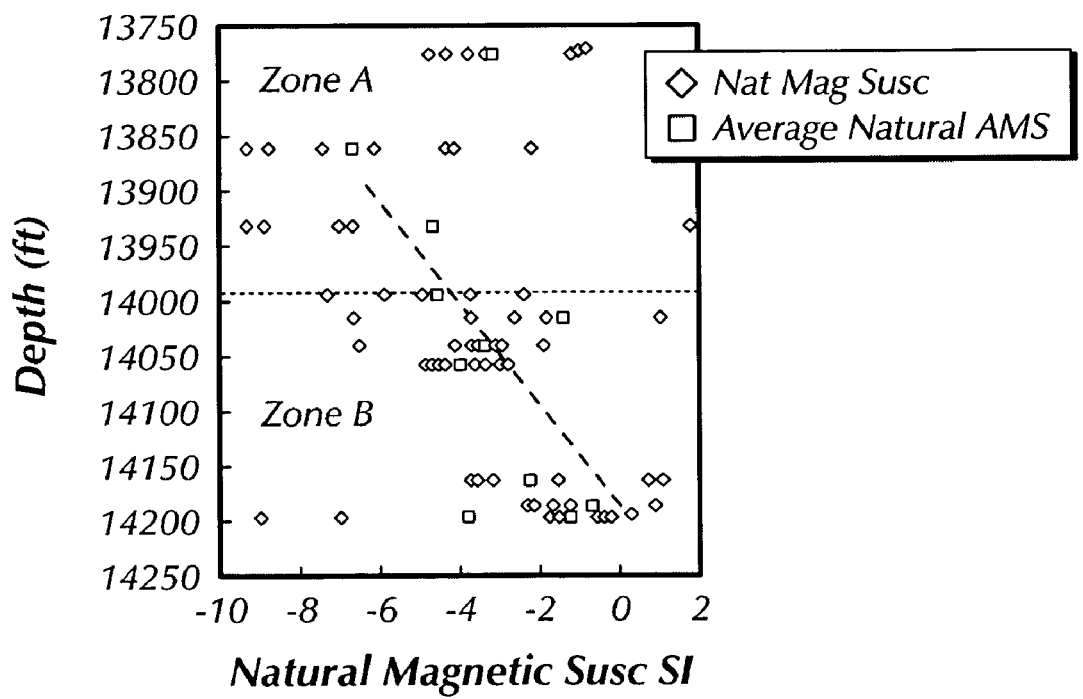
FIG. 29b is a plot of natural AMS magnetic susceptibility versus depth in a well in the studied subsurface reservoir.
Figure 29C:
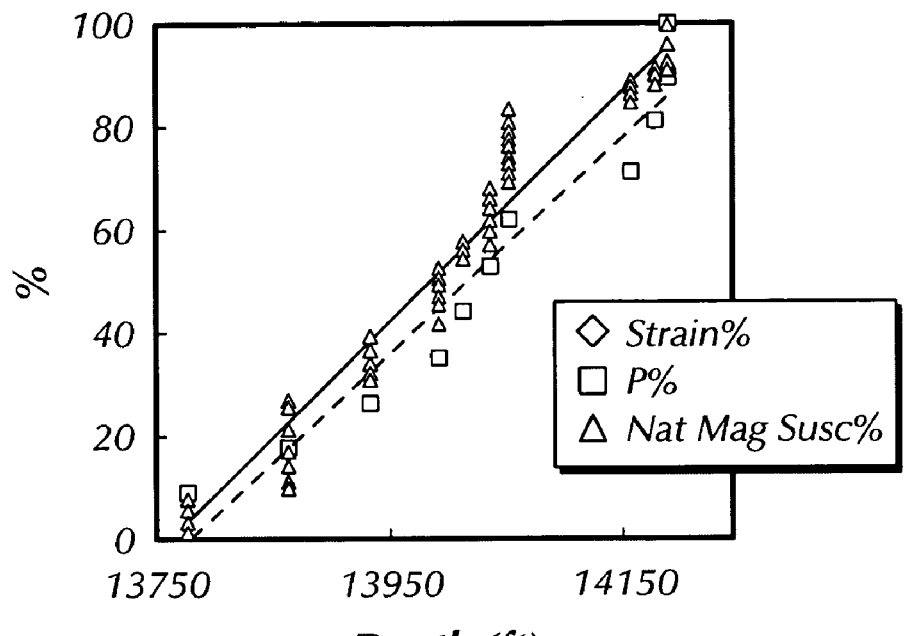
FIG. 29c is a plot of rate of change of natural magnetic susceptibility and of rock strain versus depth in a well in the studied subsurface reservoir.

The natural AMS magnitude (P) and the natural magnetic susceptibility are plotted with depth for well 1 (FIGS. 29a & 29b). This shows a general increase with depth. The increase of P from 13,850 to 14185 ft, at an average rate of 0.005 per 100 ft could be related to compaction and/or tectonic strain. To investigate the possible relationship between strain and the anisotropy degree the rate of change in strain and P with depth is plotted in FIG. 29c. The plot shows that both strain and P increase linearly with depth:

$$S = 0.185d - 2538.1, R^2 = 0.9451 \qquad (8)$$

where "S" is cumulative strain % and d is depth in ft $$P = 0.2078d - 2863.9, R^2 = 0.9391 \qquad (9)$$

where P is anisotropy degree and d is depth in ft.

Figure 29D:
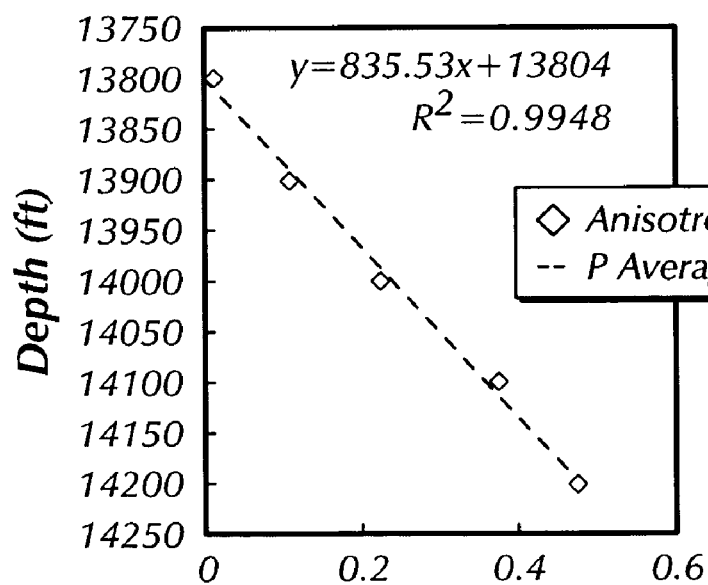
FIG. 29d is a plot of the change in bedding-perpendicular shortening manifested by pressure solution versus depth in a well in the studied subsurface reservoir.
Figure 30:
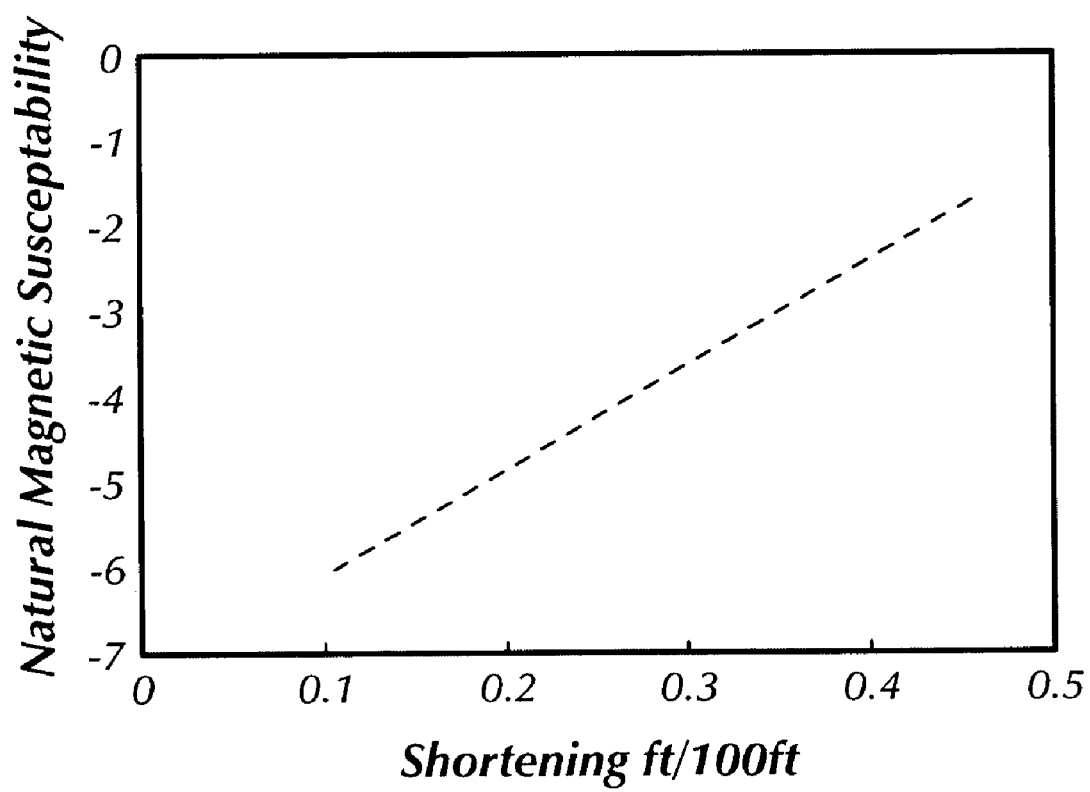
FIG. 30 is a plot of linear correlation between the natural magnetic susceptibility and pressure-solution shortening.

The tectonic strain in the reservoir is manifested mainly as microfractures (from microns to tens cm in length), and pressure solution seams. The average strain in the Zone B is 158% of that in Zone A, expressed in terms of fracture density (number per 100 ft). The principal strain axis is nearly perpendicular to the bedding and is related to forced-folding over basement uplifting. Thus the tectonic and compaction aspect of the P-anisotropy are co-axial and are difficult to isolate with high certainty. Cumulative bedding-perpendicular shortening (based on pressure solution evidence) is 0.09% in Zone A compared to 0.47% in Zone B. The shortening factor related to the pressure solution increases linearly with depth (FIG. 29d). This implies higher concentration of in-soluble residues (including paramagnetic clay minerals and ferromagnetic minerals) in the Zone B compared to the Zone A, and may also explain the higher magnetic susceptibility in the deeper sections of the reservoir. A cross-plot of the natural magnetic susceptibility and the pressure-solution shortening for Zone B shows a linear relationship (FIG. 30):

$$y=11.89x-7.3338, R^2=0.9932 \qquad (10)$$

VII. Comparison Between Gamma Log and Natural Magnetic Susceptibility

The natural magnetic susceptibility of a rock sample depends on the composition and concentration of magnetic minerals present. If iron oxides or sulphides (particularly magnetite and pyrrhotite) occur in sufficient quantities, then they will contribute a major part of the susceptibility. However, if these ferromagnetic minerals are present in only low concentrations, then other minerals, including paramagnetic clay minerals and diamagnetic quartz and calcite may represent significant contributors to the overall measured susceptibility. Clay minerals exhibit a relatively strong positive susceptibility, whereas quartz and calcite carry a much weaker negative susceptibility.

Because of this dependence on magnetomineralogy, magnetic susceptibility logs often show good correlation with gamma-ray logs. However, this type of comparison usually requires that the magnetic susceptibility be measured at regular intervals (typically ~1 ft) throughout the core. Magnetic susceptibility measurements in the present case were taken at much wider intervals (only eleven points spanning 420 ft of core in well 1 and three points, spanning ~96 ft of core in well 2).

In well 1, most of the measured susceptibility values are negative, reflecting the very low concentrations of ferromagnetic iron oxides and paramagnetic clay minerals. A few positive values occur, but these do not appear to correlate with peaks on the gamma-log. This suggests that they may reflect local concentrations of ferromagnetic iron oxide, rather than paramagnetic clay minerals and that fluctuations in the latter are too small to be detected in the available very limited magnetic susceptibility data set for this well. In contrast, strong positive susceptibilities were observed in the uppermost interval sampled in well 2, compared with weak negative values in the underlying two intervals from Zone C. This correlates with a significant decrease in the gamma-ray log, representing the transition from relatively clean sands in the Zone C to dirtier sands with higher clay mineral concentrations in the Zone B.

Figure 31A:
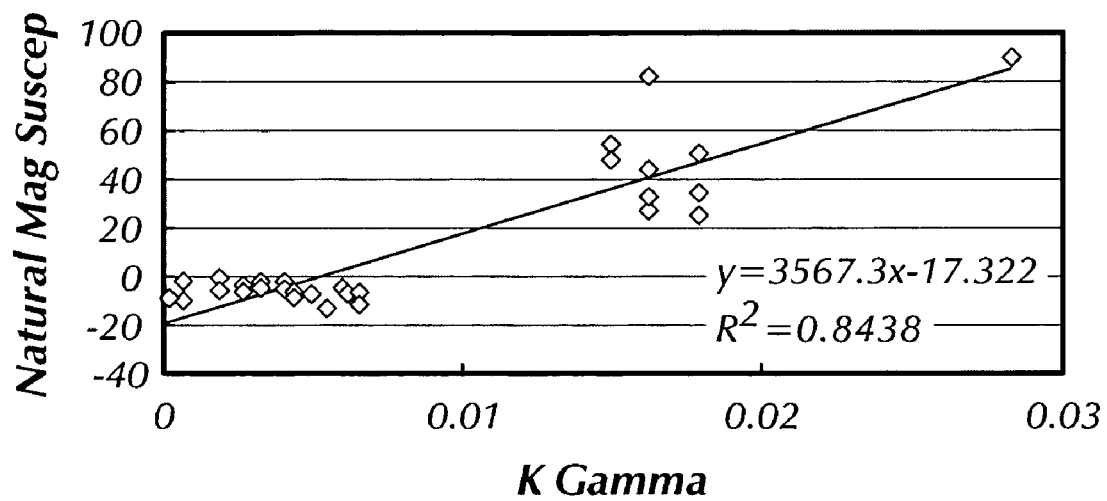
FIGS. 31a and 31b are plots of correlation between natural magnetic susceptibility and core-based gamma ray logs for samples from the studied subsurface hydrocarbon reservoir.
Figure 31B:
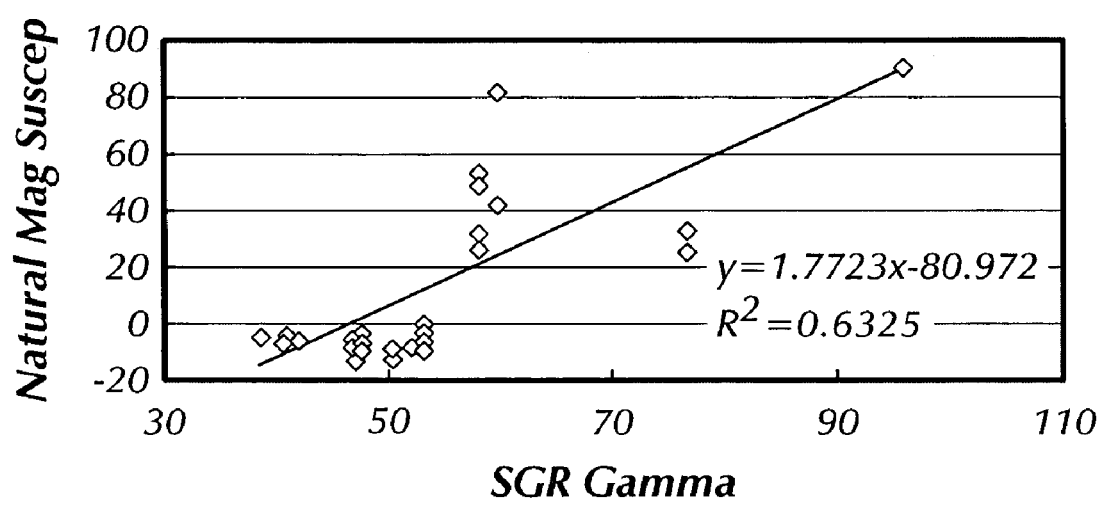

Correlation between core-based gamma log and natural magnetic susceptibility is used here to investigate any clear relationship between the two. No such correlation was found for well 1. However for well 2, a linear relationship: y=3567.3x–17.322, where y is the natural magnetic susceptibility, and x is the K-gamma API with a good correlation coefficient (0.844) between the natural magnetic susceptibility and K-gamma (FIG. 31a). The relationship with total spectral gamma (FIG. 31b) is also linear: y=1.7723x–80.972, where y is the natural magnetic susceptibility, and x is the spectral-gamma API, with a moderate correlation coefficient (0.633).

IX. Closing Observations

The test data obtained above dealing with microfractured reservoirs characterization were compared with data from other sources regarding the known test reservoir. This existing gas reservoir is an excellent candidate for this purpose due to:

1. The proven existence and perceived impact on reservoir performance of the microfractures obtained from using azimuthal seismic data and well testing.
2. Operational/reservoir-management needs to better delineate and understand the reservoir including the fractures.

This field has been the subject of other geological and geophysical studies that helped in delineating the fractures on reservoir-scale. This prior knowledge makes the test reservoir an ideal testing place for the technology.

Based on this, it was possible to validate the results and assumptions made with the present invention concerning the microfracture characterization. The geological validation of the technology aims at verifying:

1. The existence of natural open fractures in samples which the enhanced AMS with the present invention diagnosed as fractured.
2. The orientation of the fractures as detected from enhanced AMS analysis according to the present invention.

Fifteen samples were selected for this purpose. The choice is made to cover the two main classes of enhanced AMS-diagnosed fabrics:

1. Microfracture-type fabrics (eight samples)
2. Depositional-style (non-fractured) fabrics (seven samples).

Due to the size of the fractures, microscopy is used for the geological inspection. This is achieved by dissecting the enhanced AMS-tested samples and inspecting them using both optical and scanning electron microscopy. Three mutually perpendicular thin sections were cut from each cube sample, as explained in the methodology previously described herein.

A total of thirty-six thin sections were obtained from twelve chosen samples. The use of the three mutually perpendicular thin sections gives the closest possible perspective to the three-dimensional nature of the fractures and therefore reduces the chance of missing them if only one or two random thin sections were used. The occurrence or lack of fractures is therefore verified for each Enhanced AMS-sample from their occurrence in one or more of the three key thin sections. During the verification each of the studied thin sections was placed in one of the three following classes:

1. No significant fractures were observed.
2. Fractures were observed, with similar orientations to the microfracture-type fabrics determined by enhanced AMS.
3. Fractures were observed, but their orientations differ significantly from the enhanced AMS microfracture-type fabrics.

The following principal conclusions are derived from these observations:

1. Fractures were detected and positively verified in 100% of the cube samples that were diagnosed as fractured from the enhanced AMS tests. These include fractures occurring along grain boundaries and fractures that cut across grains. Specifically, a vertical thin section along a vertical surface of a cube specimen like that shown in FIG. 14 was made. Open, steep dipping microfractures occurred along grain boundaries as well as across grains. There was also evidence of incipient shear. Scanning electron microscope or SEM images showed an intra-granular open fracture, with smaller, second-order fractures. A vertical thin section of another cube specimen of the type discussed above showed two sets of open, steep dipping microfractures. The microfractures occurred along grain boundaries and to a lesser extent across grains.

2. The microscopically identified fractures have similar orientations to microfracture strikes identified from enhanced AMS fabrics in ≈89% of the samples.

3. The advantage of the enhanced AMS method over conventional geological methods, which rely on thin sections only, is demonstrated by comparing the accuracy in detecting fractures in each cube by enhanced AMS (100%) compared to using thin sections of the same cube (62.5%). The latter shows margin of error of 37.5%. This illustrates the general problem of identifying three-dimensional structures from two-dimensional thin sections as compared to the enhanced AMS method that reflects the actual fabric properties of the entire volume of rock within the cubic sample, in terms of orientation, as well as occurrence at sufficient density and connectivity to be detected.

4. The instances of fractures detected by microscopy (19% of thin sections, and 43% of cubes) in samples that are diagnosed as non-fractured by the enhanced AMS technology were investigated and found to represent low-density, localized microfractures related to microstylolites. These have no sufficient impact on effective porosity. This demonstrates further the efficiency of enhanced AMS in detecting open, connected, pervasive fractures that have an impact on the reservoir petrophysics.

5. Samples diagnosed as non-fractured in the enhanced AMS tests showed depositional fabric in the thin sections.

This geological verification of the enhanced AMS fracture characterization is further supported by the following observations:

1. Microfracture orientations determined from enhanced AMS conform to the ENE-WSW regional in-situ stress and open fractures direction known to exist in the reservoir from other data.

2. The porosity trends detected from enhanced AMS follows the trend of the conventionally measured porosity trends, obtained independently from another set of plugs (FIGS. 19 & 20).

3. Porosity magnitude from enhanced AMS in microfractured samples is consistently higher than those in non-fractured samples (FIGS. 19 & 20).

The effective-porosity profile obtained from the enhanced AMS tests is similar to that of the conventionally acquired porosity. The tests indicate reservoir effective porosity increases due to fracture occurrence by 30.66% to 47.93% in Zones B and C. The mean effective porosity in well 1 increases by 51.52% due to fracture occurrence. Maximum permeability trend of NE-SW with total permeability anisotropy (the difference between maximum and minimum permeability in 3-D) of about 16% is detected in both fractured and non-fractured samples. In addition the fracture permeability is deduced from applying the porosity-permeability transforms based on the conventional plug tests independently conducted. The occurrence of fractures is estimated to cause an increase in average permeability of 74.69% in Zone B and 59.89% in Zone A.

One important aspect about the AMS process of the present invention described is its link to petrophysics. In addition to fracture orientation, it is possible to acquire fracture porosity and permeability anisotropy, an important bridge between geological and engineering applications.

Depositional-style fabrics show that the test reservoir sands were sourced from a general SW direction. Paleomagnetically-reoriented cross-bedding directions measured at three points in the Zone A core from well 1 support these data. The cross bedding indicates a mean transport direction towards the NE in the particular intervals measured.

The natural AMS ellipsoid (which reflects that of magnetic mineral fabric of the rock), includes both prolate and oblate types; with the oblate shape grains are more common and a very good linear correlation between the lineation and the foliation. The orientation of the natural AMS ellipsoid ($K_{max}$ and $K_{min}$ axes) displays a much wider dispersion than the corresponding enhanced AMS data. This is mainly because the natural AMS is very weak and close to the instrument noise level for many samples. A weakly defined $K_{max}$, nearly orthogonal to the mean sediment transport direction inferred from the enhanced AMS data, is characteristic of a flow-transverse alignment of grain long axes.

Such a combination of flow-parallel enhanced AMS (quartz grain fabric) and flow-transverse natural AMS (magnetite fabric) has been observed in other studies of fluvial and turbidite sediments, where traction transport processes dominate. It appears to reflect the tendency for relatively light quartz grains to become aligned with their long axes parallel with fluid shear, while denser magnetite grains tend to roll over the substrate, with their axes transverse to the flow direction.

The natural AMS magnitude (P) and the natural magnetic susceptibility generally increase with depth. The increase of P could be related to compaction and/or tectonic strain. Bulk strain is found to increase linearly with depth. In addition, the shortening factor related to the pressure solution increases linearly with depth. This implies higher concentration of insoluble residues in the Zone B compared to the Zone A and may also explain the higher magnetic susceptibility in the deeper sections of the reservoir. A cross-plot of the natural magnetic susceptibility and the pressure-solution shortening for Zone B shows a proportional linear relationship.

Correlation between core-based gamma log and natural magnetic susceptibility was used to investigate any clear relationship between the two. In the case of well 1, the core gamma log data are missing and therefore not included here. However for well 2, there is a linear relationship with a good correlation coefficient between the natural magnetic susceptibility and K-gamma and a moderate correlation coefficient with the total spectral gamma. Therefore gamma logs may be used to predict the natural magnetic susceptibility in wells where no core is available.

X. Conclusions

From the foregoing, it can be seen that according to the process of the present invention, enhanced AMS techniques described herein can be applied to identify the presence of microfracture-type fabrics in subsurface hydrocarbon reservoirs. Three separate characteristics of the enhanced AMS are applicable for distinguishing samples carrying depositional-style (non-fractured) fabrics from those with microfracture-type fabrics. These are the bulk magnetic susceptibility, K, the strength of the magnetic foliation parameter, F, and the directional properties of the measured enhanced AMS fabric. Microfracture strikes determined according to the present invention consistently conform to the ENE-WSW regional in-situ stress and open fractures direction known to exist in the reservoir from other types of data.

The effective porosity of samples can be determined from their magnetic susceptibility after ferrofluid-saturation, using the known susceptibility per unit volume of the ferrofluid and other calibration information. This is referred to as the enhanced AMS porosity.

Direct porosity measurements were not available from the actual samples used in the results described herein, but comparison with values from routine measurements on nearby samples confirms that the general porosity trends with depth defined from the enhanced AMS effective-porosity measurements are broadly similar to those defined from direct porosity measurements.

The maximum horizontal permeability direction in the reservoir determined by the enhanced AMS technology is oriented approximately NE-SW in both wells. The degree of horizontal permeability anisotropy (i.e. the permeability variation within the horizontal plane, sub-parallel with bedding) is about 6.5% and the total permeability anisotropy (the difference between maximum and minimum permeability in 3-D) is typically about 16%. These values are broadly similar to those observed in previous studies of non-fractured reservoirs elsewhere. This suggests that although the generation of microfracture fabrics significantly enhances the porosity (and bulk permeability) of the reservoir, within the studied sections, it has less effect on the permeability anisotropy.

Thus, the mean permeability anisotropy of samples with the present invention with microfracture-type fabrics is 16.6% whereas that of samples with depositional fabrics is 15.4%. However, this degree of permeability anisotropy is sufficiently large to have a significant impact on the fluid-flow characteristics of the reservoir. It is appropriate that the direction of maximum horizontal permeability should be incorporated into the reservoir model. In addition the fracture permeability is deduced from applying the porosity-permeability transforms based on the conventional plug tests conducted independently. The occurrence of fractures is estimated to cause an increase in average permeability of 59.89% and 74.69% in Zone A and Zone B, respectively.

Enhanced AMS data from samples with depositional-style fabrics show that the reservoir sands sampled were sourced from a general SW direction. Paleomagnetically-reoriented cross-bedding directions measured at three points in the Zone A core from well 1 support these data. The cross bedding indicates a mean transport direction towards the NE in the particular intervals measured.

It should be noted that the data obtained for testing herein used a clastic reservoir in which the effects of microfracture fabrics are superimposed on those of matrix pore fabric. However, the process of the present invention should apply with success to reservoirs in which microfractures are either the only source or effectively the predominant or essential source of porosity.

It should be noted and understood that there can be improvements and modifications made of the present invention described in detail above without departing from the spirit or scope of the invention as set forth in the accompanying claims.

What is claimed is:

1. A method of analyzing a subsurface hydrocarbon reservoir of interest to characterize microfractures in the reservoir, comprising the steps of:
    obtaining rock specimens from a core sample from the subsurface hydrocarbon reservoir;
    determining remanent magnetization of the rock specimens;
    determining natural magnetic susceptibility of a first of the rock specimens;
    saturating a second of the rock specimens with a magnetic fluid to enhance the magnetic susceptibility of the second specimen;
    determining the enhanced magnetic susceptibility of the second rock specimen;
    determining from the natural magnetic susceptibility and the enhanced magnetic susceptibility a characterization of microfractures in the subsurface hydrocarbon reservoir.

2. The method of claim 1, wherein the characterization of microfractures in the subsurface hydrocarbon reservoir is the relative presence of microfractures.

3. The method of claim 2, wherein the characterization of microfractures in the subsurface hydrocarbon reservoir is the orientation of the microfractures.

4. The method of claim 1, further including the step of characterizing the fracture porosity of formation rock in the subsurface hydrocarbon reservoir.

5. The method of claim 1, further including the step of characterizing the permeability of formation rock in the subsurface hydrocarbon reservoir.

6. The method of claim 1, further including the step of characterizing the anisotropy of formation rock in the subsurface hydrocarbon reservoir.

7. The method of claim 1, wherein the step of determining a characterization of microfractures in the subsurface hydrocarbon reservoir includes the step of determining magnetic foliation of the first and second rock specimens.

8. The method of claim 1, wherein the step of determining a characterization of microfractures in the subsurface hydrocarbon reservoir includes the step of determining magnetic lineation of the first and second rock specimens.

9. The method of claim 1, wherein the step of determining a characterization of microfractures in the subsurface hydrocarbon reservoir includes the step of determining magnetic anisotropy degree of the first and second rock specimens.

10. The method of claim 1, wherein the first and second rock specimens are obtained from opposite sides of the core sample.

11. The method of claim 1, further including the step of assigning geographic orientation co-ordinates for the core sample with respect to a reference direction.

12. The method of claim 1, further including the step of removing spurious magnetism from the rock specimens prior to determining the magnetic susceptibility thereof.

13. The method of claim 1, further including the step of determining remanent magnetization includes the step of isolating geologically significant components of the magnetization of the rock specimens.

14. The method of claim 1, further including the step of drying the second specimen prior to the step of saturating the second specimen with a magnetic fluid.

15. The method of claim 1, wherein the step of determining natural magnetic susceptibility includes the step of forming a vector measurement K of the natural magnetic susceptibility.

16. The method of claim 15, further including the step of representing the vector measurement K as a three-dimensional ellipsoid.

17. The method of claim 1, wherein the step of determining enhanced magnetic susceptibility includes the step of forming a vector measurement K of the natural magnetic susceptibility.

18. The method of claim 17, further including the step of representing the vector measurement K as a three-dimensional ellipsoid.

* * * * *